(12) United States Patent
Tashiro et al.

(10) Patent No.: US 10,483,851 B2
(45) Date of Patent: Nov. 19, 2019

(54) VOLTAGE CONVERSION DEVICE AND METHOD OF DECIDING LEAKAGE INDUCTANCE

(71) Applicant: Sumitomo Electric Industries, Ltd., Osaka-shi (JP)

(72) Inventors: Keiji Tashiro, Osaka (JP); Xiaoguang Zheng, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/308,736

(22) PCT Filed: May 29, 2017

(86) PCT No.: PCT/JP2017/019827
§ 371 (c)(1),
(2) Date: Dec. 10, 2018

(87) PCT Pub. No.: WO2017/212954
PCT Pub. Date: Dec. 14, 2017

(65) Prior Publication Data
US 2019/0149049 A1    May 16, 2019

(30) Foreign Application Priority Data
Jun. 10, 2016 (JP) .................. 2016-116530

(51) Int. Cl.
*H02M 3/158* (2006.01)
*H02M 3/155* (2006.01)
*H01F 27/28* (2006.01)
*H02M 1/08* (2006.01)
*H02M 1/14* (2006.01)

(52) U.S. Cl.
CPC .......... *H02M 3/1584* (2013.01); *H01F 27/28* (2013.01); *H02M 1/08* (2013.01); *H02M 1/14* (2013.01); *H02M 3/155* (2013.01); *H02M 2003/1586* (2013.01)

(58) Field of Classification Search
CPC .. H02M 3/158; H02M 3/1584; H02M 3/1588; H02M 2003/1586
See application file for complete search history.

(56) References Cited

U.S. PATENT DOCUMENTS 6,362,986 B1   3/2002  Schultz et al.
7,199,695 B1 * 4/2007  Zhou ....................... H01F 37/00
                                                              336/212

FOREIGN PATENT DOCUMENTS

JP  2005-224058 A   8/2005
JP  2012-29549 A    2/2012
JP  2015-231311 A   12/2015

* cited by examiner

*Primary Examiner* — Gary L Laxton
(74) *Attorney, Agent, or Firm* — Baker Botts L.L.P.; Michael A. Sartori

(57) ABSTRACT

Provided is a voltage conversion device including: a voltage conversion circuit having two inductors that are wound around a core and that magnetically cancel each other out, and switching elements that switch current flowing through the respective inductors; and a control unit that alternately turns on and off each of the switching elements. The coupling coefficient of the two inductors is in the range from −0.99 to −0.78.

6 Claims, 33 Drawing Sheets

F I G . 8
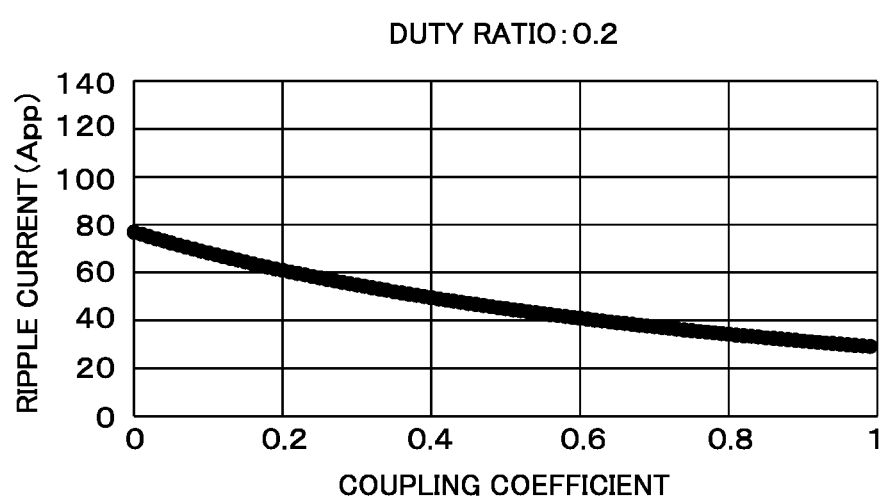

F I G . 1 2
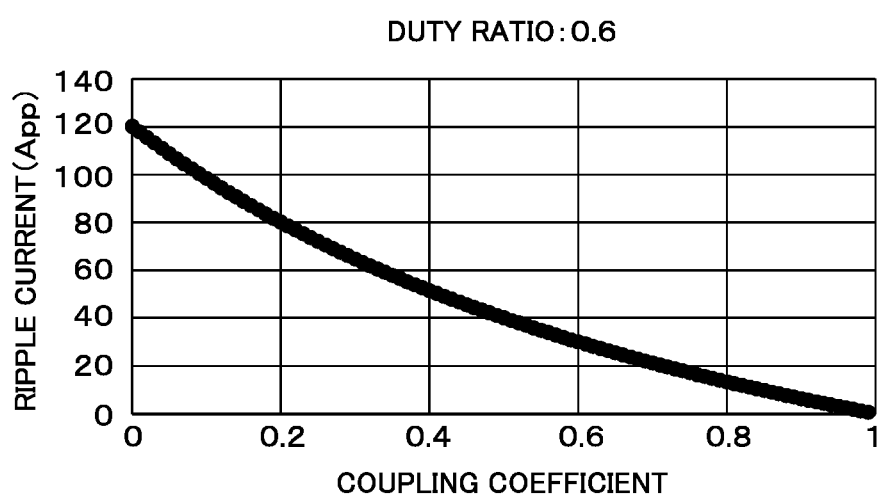

F I G . 13
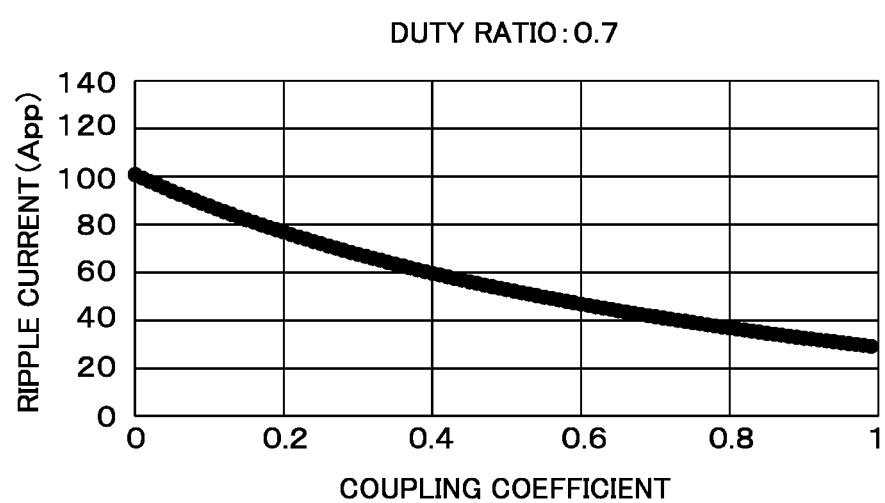

F I G . 14
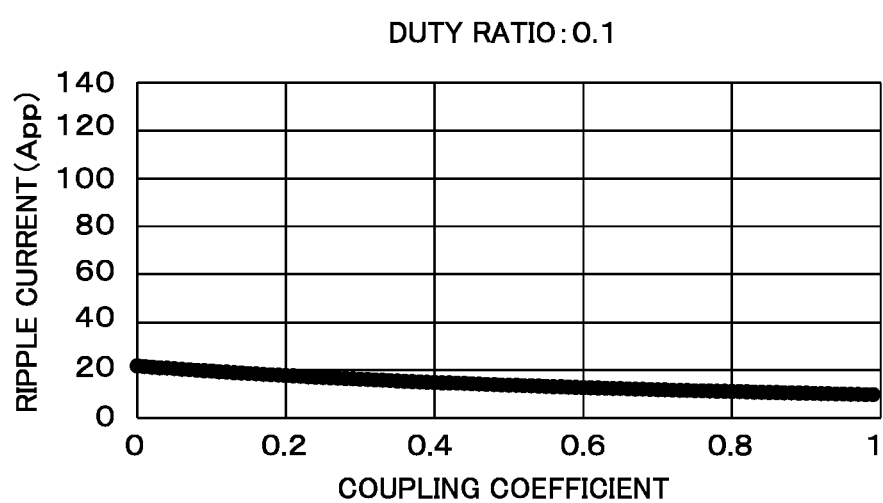

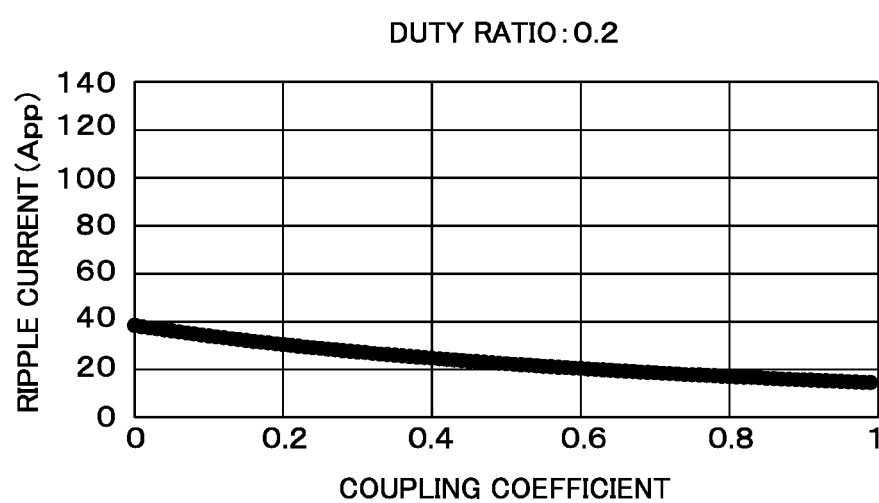
F I G. 15

F I G . 16
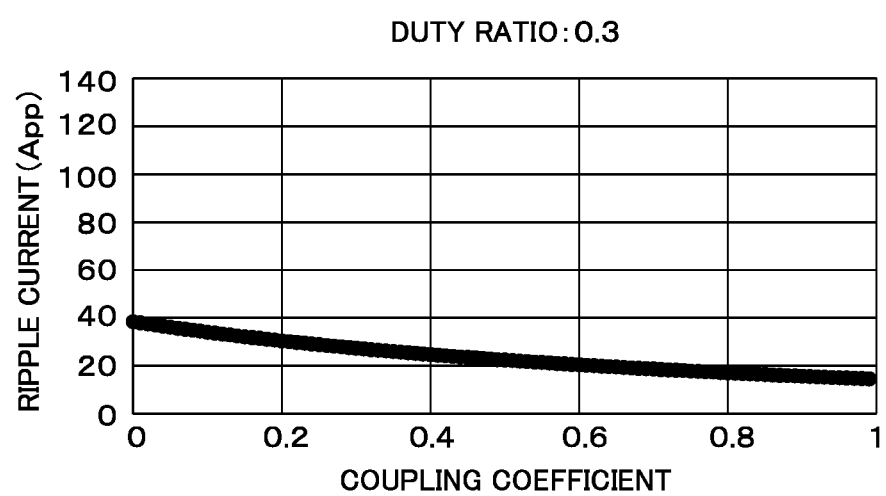

F I G . 17
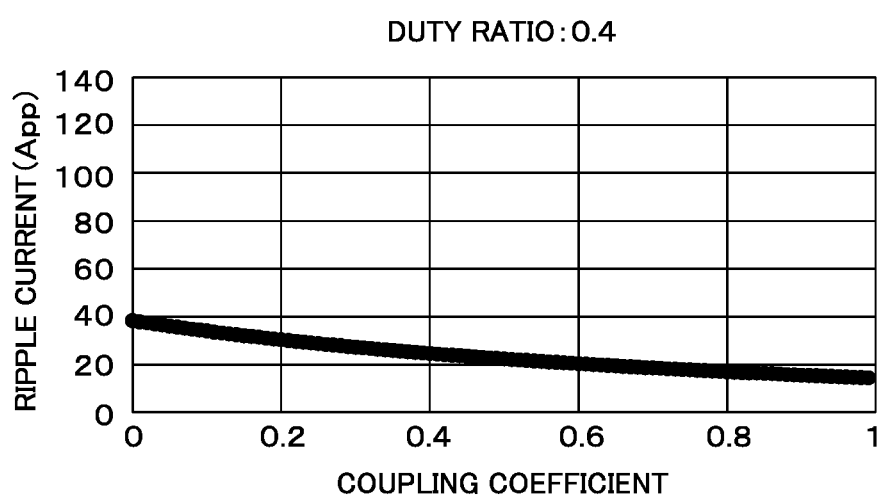

F I G. 18
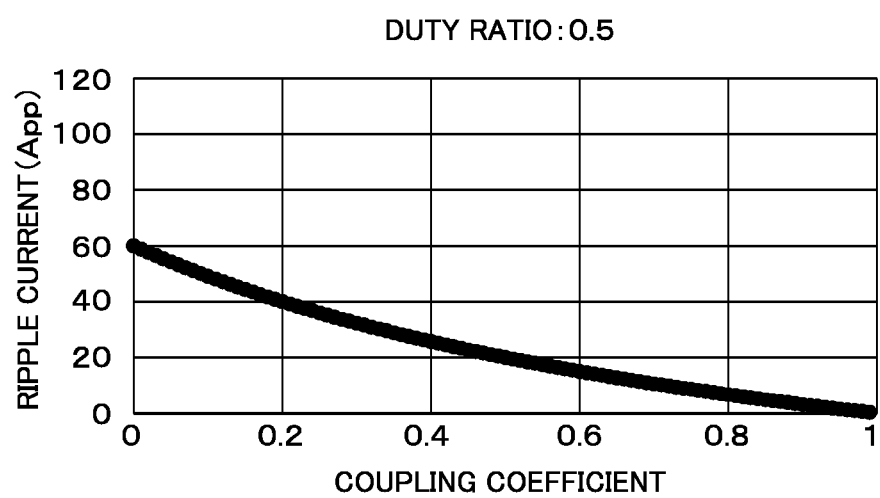

FIG. 23

|  | COUPLING COIL A | COUPLING COIL B | COUPLING COIL C | COUPLING COIL D |
|---|---|---|---|---|
| COUPLING COEFFICIENT k | 0.78 | 0.86 | 0.96 | 0.98 |
| VOLUME ($cm^3$) | 22 | 24 | 23 | 21 |

VOLTAGE CONVERSION DEVICE AND METHOD OF DECIDING LEAKAGE INDUCTANCE

FIELD

The present invention relates to a voltage conversion device and a method of deciding leakage inductance.

The present application is the national phase under 35 U.S.C. § 371 of PCT International Application No. PCT/JP2017/019827 which has an International filing date of May 29, 2017 and designated the United States of America.

The present application claims the benefit of priority based on Japanese Patent Application No. 2016-116530 filed on Jun. 10, 2016, the entire contents of which are incorporated herein by reference.

BACKGROUND

A DC/DC converter (hereinafter simply referred to as "converter") that converts direct current (DC) voltage to desired DC voltage by raising or lowering the voltage has been used in various fields. A converter outputs required voltage by switching current flowing through an inductor. In order to increase output current while reducing ripple of the output current and to miniaturize the device, a multi-phase (multiple phase) converter has been employed that includes multiple converters that are connected in parallel and that operate in different phases.

For example, Patent Document 1 (Japanese Patent Application Publication Laid-Open No. 2005-224058) describes a step-up DC/DC converter that alternately applies excitation current to the first and second coils using first and second coils wound in opposite directions around the same core as well as a pair of switches, to generate current at the second and first coils in directions canceling out the magnetic fluxes of the core and to output current from the second and first coils accumulated by a diode. This DC/DC converter may have a reduced core size, since the magnetization of the core by the first and second coils are canceled out to suppress magnetic saturation of the core.

It has been known that, in a so-called interleaved DC/DC converter using the technique described in Patent Document 1, a coupling coefficient between the first and second coils is closely related to the ripple current in the first and second coils. In view of this, Patent Document 2 (Japanese Patent Application Publication Laid-Open No. 2015-231311) discloses a technique of reducing ripple current by setting a coupling coefficient k between inductors to be within the range of $-0.4 < k \leq -0.1$ in the case where the current flowing through two inductors corresponding to the first and second coils is switched at a duty ratio in the range from 5% to 40%, compared to the case where k is 0.

SUMMARY

A voltage conversion device according to one aspect of the present invention, comprises: a voltage conversion circuit including two inductors that are wound around a core and that magnetically cancel each other out, and switching elements that respectively switch current flowing through the two inductors; and a control unit that alternately turns on and off each of the switching elements, and the two inductors have a coupling coefficient in a range from $-0.99$ to $-0.78$.

A method of deciding leakage inductance according to one aspect of the present invention is a method of deciding leakage inductance of two inductors in a voltage conversion device including switching elements that respectively switch current flowing through the two inductors that are wound around a core and magnetically cancel each other out, each of the switching elements being turned on or off by a control unit, comprising: preparing two first inductors with a coupling coefficient of 0, and two second inductors having leakage inductance of a same magnitude as self inductance of the first inductors and a coupling coefficient close to $-1$; connecting the two first inductors in place of the two inductors; obtaining a first change characteristic with respect to a duty ratio in a predetermined range where the control unit turns on each of the switching elements, for ripple current flowing through the first inductors; connecting the two second inductors in place of the two first inductors; obtaining a second change characteristic with respect to the duty ratio in the predetermined range, for ripple current flowing through the second inductors; calculating a reduction rate of ripple current based on a result obtained by comparing the obtained first and second change characteristics with each other; setting a reduction rate of the magnitude of leakage inductance of the second inductors to a reduction rate equal to or lower than the calculated reduction rate of ripple current; deciding a magnitude of leakage inductance of the two inductors so as to obtain the reduction rate; and setting a coupling coefficient of the two second inductors as a coupling coefficient of the two inductors.

The present application may be implemented as a voltage conversion device and a method of deciding leakage inductance including such characteristic processing units and steps, and also be implemented by using a part or whole of the voltage conversion device as a semiconductor integrated circuit, or be implemented as another system including the voltage conversion device.

The above and further objects and features will more fully be apparent from the following detailed description with accompanying drawings.

BRIEF DESCRIPTION OF THE DRAWINGS

FIG. 8 is a graph illustrating the relationship between a coupling coefficient and ripple current in the case where the leakage inductance is 1 µH;

FIG. 12 is a graph illustrating the relationship between a coupling coefficient and ripple current in the case where the leakage inductance is 1 µH;

FIG. 13 is a graph illustrating the relationship between a coupling coefficient and ripple current in the case where the leakage inductance is 1 µH;

FIG. 14 is a graph illustrating the relationship between a coupling coefficient and ripple current in the case where the leakage inductance is 2 µH;

FIG. 15 is a graph illustrating the relationship between a coupling coefficient and ripple current in the case where the leakage inductance is 2 µH;

FIG. 16 is a graph illustrating the relationship between a coupling coefficient and ripple current in the case where the leakage inductance is 2 µH;

FIG. 17 is a graph illustrating the relationship between a coupling coefficient and ripple current in the case where the leakage inductance is 2 µH;

FIG. 18 is a graph illustrating the relationship between a coupling coefficient and ripple current in the case where the leakage inductance is 2 µH;

FIG. 23 is a table illustrating volume of a core measured for a coupling coil in the case where the leakage inductance is 0.9 µH;

DETAILED DESCRIPTION

Figure 1:
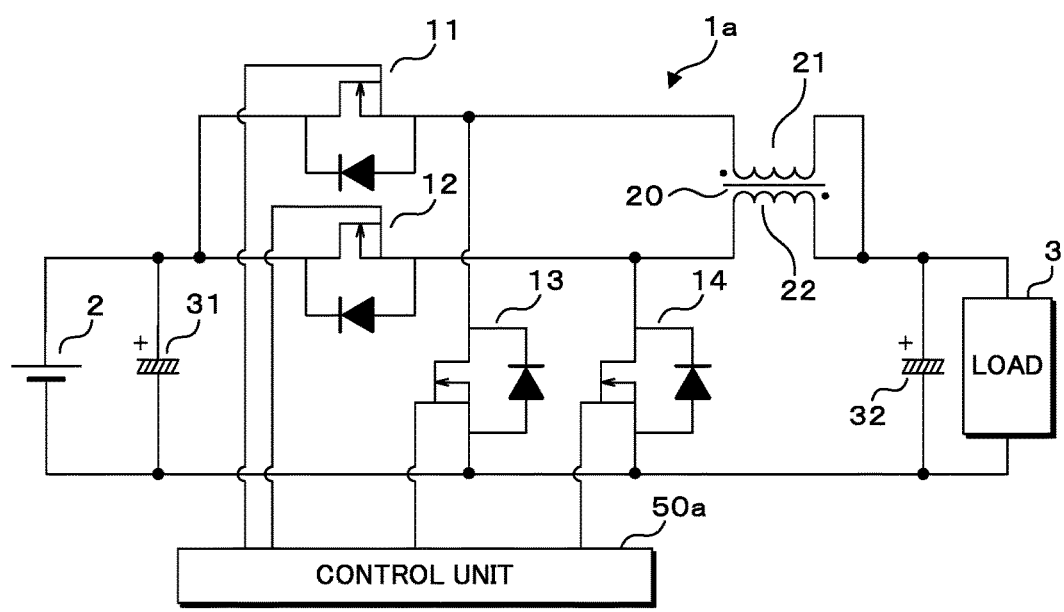
FIG. 1 is a block diagram illustrating a configuration example of a voltage conversion device according to Embodiment 1.

The technique disclosed in Patent Document 1 describes that an inductor is short-circuited if the duty ratio for switching current flowing through the inductor exceeds 50%. It is thus assumed that an inductor with leakage inductance as close to 0 as possible, in other words, an inductor where k is substantially −1 is employed, greatly restricting the variable range of a duty ratio.

Moreover, the technique disclosed in Patent Document 2 describes the range of the coupling coefficient k where the ripple current of the inductor is more reduced compared to the case where k is 0, if two inductors of constant self inductance are wound around a core of a certain size (or are so assumed from the description), which however is not directed to reduce the size of the core. Thus, Patent Document 2 neither discloses nor suggests any technique of reducing the size of a core in a range where the ripple current of the inductor is less increased compared to the case where the coupling coefficient k is 0.

The present invention has been made in view of the circumstances described above, and aims to provide a voltage conversion device with a reduced size of a core around which two inductors that magnetically cancel each other out are wound, and to provide a method of deciding leakage inductance capable of reducing the size of the core.

According to the disclosure of the present application, the size of the core around which two inductors that magnetically cancel each other out are wound may be reduced.

First, embodiments of the present invention will be listed in the following description. At least parts of the embodiments described below may arbitrarily be combined together.

(1) A voltage conversion device according to one aspect of the present invention, comprises: a voltage conversion circuit including two inductors that are wound around a core and that magnetically cancel each other out, and switching elements that respectively switch current flowing through the two inductors; and a control unit that alternately turns on and off each of the switching elements, and the two inductors have a coupling coefficient in a range from −0.99 to −0.78.

According to the present aspect, the control unit alternately turns on and off two switching elements in the voltage conversion circuit, and the switching elements respectively switch the current flowing through two inductors that are wound around a core and that magnetically cancel each other out, to convert voltage inputted to the voltage conversion circuit and output the converted voltage. The two inductors have the coupling coefficient k, which is closely related to the leakage inductance, within the range of $-0.99 \le k \le -0.78$.

That is, such inductors may be applied that have k closer to −1 than the conventional case ($-0.4 < k \le -0.1$ as described in Patent Document 2) in the range where ripple current of the inductor is less increased compared to the case where the coupling coefficient k between two inductors is 0, and that have leakage inductance smaller than the self inductance occurring when k is 0, as k becomes closer to −1.

(2) It is preferable that a magnitude of leakage inductance of the two inductors corresponds to a value less than one time and 0.45 times or more of a magnitude of self inductance that is required to reduce ripple current flowing through the two inductors at a predetermined reduction rate, in a case where the coupling coefficient of the two inductors is 0.

According to the present aspect, the magnitude of leakage inductance of two inductors is set as less than one time and equal to or more than 0.45 times of the magnitude of the self inductance which is required when the coupling coefficient is 0.

Thus, as the magnitude of leakage inductance is closer to a value 0.45 times the self inductance, the size of the core is reduced.

(3) It is preferable that a duty ratio at which the control unit turns on each of the switching elements is in a range from 0.1 to 0.7.

According to the present aspect, the current flowing through two inductors is switched at a duty ratio D in the range of $0.1 \leq D \leq 0.7$.

This allows for switching at a higher duty ratio compared to the conventional case (D<0.5 as described in Patent Document 1 or $0.05 \leq D \leq 0.40$ as described in Patent Document 2), and thus higher output voltage may be obtained for the same input voltage.

(4) It is preferable that the voltage conversion device comprises N sets of the voltage conversion circuits (N is a natural number larger than 1), the N sets of the voltage conversion circuits are connected in parallel to one another, and the control unit turns on and off the switching elements of each of the voltage conversion circuits with phases each shifted by $\pi/N$.

According to the present aspect, the control unit alternately turns on and off two switching elements included in each of N voltage conversion circuits with a phase difference $\pi$, while turning on and off each one of the two switching elements with a phase shifted by $\pi/N$.

This may uniformly disperse switching losses to N voltage conversion circuits and may also reduce the ripple current contained in the output to 1/N.

(5) A method of deciding leakage inductance according to one aspect of the present invention is a method of deciding leakage inductance of two inductors in a voltage conversion device including switching elements that respectively switch current flowing through the two inductors that are wound around a core and magnetically cancel each other out, each of the switching elements being turned on or off by a control unit, comprising: preparing two first inductors with a coupling coefficient of 0, and two second inductors having leakage inductance of a same magnitude as self inductance of the first inductors and a coupling coefficient close to −1; connecting the two first inductors in place of the two inductors; obtaining a first change characteristic with respect to a duty ratio in a predetermined range where the control unit turns on each of the switching elements, for ripple current flowing through the first inductors; connecting the two second inductors in place of the two first inductors; obtaining a second change characteristic with respect to the duty ratio in the predetermined range, for ripple current flowing through the second inductors; calculating a reduction rate of ripple current based on a result obtained by comparing the obtained first and second change characteristics with each other; setting a reduction rate of the magnitude of leakage inductance of the second inductors to a reduction rate equal to or lower than the calculated reduction rate of ripple current; deciding a magnitude of leakage inductance of the two inductors so as to obtain the reduction rate; and setting a coupling coefficient of the two second inductors as a coupling coefficient of the two inductors.

According to the present aspect, the first change characteristic of ripple current with respect to a predetermined range of duty ratio that is obtained using two first inductors with the coupling coefficient k of 0 is successively compared with the second change characteristic of ripple current with respect to a predetermined range of duty ratio that is obtained using two second inductors having the same leakage inductance as the self inductance of the first inductors and having k close to −1 for a predetermined range of duty ratio, to decide leakage inductance of each of the two inductors based on the reduction rate of ripple current calculated from the result of comparison.

Thus, the reduction rate of ripple current that is reduced by k being close to −1 and the increase rate of ripple current that is increased by reducing leakage inductance are canceled out, which reduces the size of the core in accordance with the reduction in leakage inductance.

(6) It is preferable that the calculating of the reduction rate calculates a reduction rate of ripple current at one duty ratio where ripple current is reduced at a lowest rate in the second change characteristic with respect to the first change characteristic, the reduction rate of the magnitude of leakage inductance of the second inductors is set to a same reduction rate as the calculated reduction rate of ripple current, and the magnitude of leakage inductance of the two inductors is decided so as to obtain the reduction rate.

According to the present aspect, the first and second change characteristics are successively compared with each other with respect to a predetermined range of duty ratio, the lowest reduction rate for the ripple current of the second change characteristic with respect to the ripple current of the first change characteristic is calculated, the magnitude of leakage inductance of the second inductors is reduced at a calculated reduction rate, and the leakage inductance with reduced magnitude is decided as leakage inductance for each of the two inductors.

Since the reduction rate of ripple current guaranteed in the worst case for a predetermined range of duty ratio is thus calculated, in the case where the leakage inductance of each of two inductors is decided by reducing the magnitude of leakage inductance of the second inductors at the same reduction rate, the ripple current with respect to a predetermined range of duty ratio will not exceed the ripple current generated when the two first inductors are used.

Specific examples of the voltage conversion device according to embodiments of the present invention will now be described below with reference to the drawings. It is to be noted that the present invention is defined by the appended claims rather than by the illustrated examples, while all changes that fall within metes and bounds of the claims, or equivalence of such metes and bounds thereof are therefore intended to be embraced by the claims. The technical features described in example embodiments may be combined with one another.

Embodiment 1

FIG. 1 is a block diagram illustrating a configuration example of a voltage conversion device according to Embodiment 1. The voltage conversion device includes a voltage conversion circuit 1a that lowers the voltage supplied from an external power supply 2 and supplies the voltage to an external load 3, and a control unit 50a that controls conversion of voltage by the voltage conversion circuit 1a. Capacitors 31 and 32 are connected in parallel to the power supply 2 and the load 3.

The voltage conversion circuit 1a includes inductors 21 and 22 that are wound around a core 20 to cancel out magnetism caused by the current from the power supply 2, and N-channel metal oxide semiconductor field effect transistors (MOSFET) (hereinafter referred to as FET) 11 and 12 that are switching elements to switch current flowing from the power supply 2 to the inductors 21 and 22.

The drain of each of the FETs 11 and 12 is connected to the positive side of the power supply 2, while the gate thereof is connected to the control unit 50a. The source of each of the FETs 11 and 12 is connected to one end of each of the inductors 21 and 22. The other end of each of the inductors 21 and 22 is connected to one end of the load 3. Connection points between the inductors 21, 22 and the FETs 11, 12 are respectively connected to the drains of the FETs 13 and 14 for synchronous rectification. The gate of each of the FETs 13 and 14 is connected to the control unit 50a. The negative side of the power supply 2, the source of each of the FETs 13 and 14, and the other end of the load 3 are connected to a common ground potential.

The control unit 50a alternately turns on and off the FETs 11 and 12 by applying drive signals having phases shifted by π to the gate of each of the FETs 11 and 12. The control unit 50a applies drive signals having phases of on and off inverted from those of the drive signals of the FETs 11 and 12 to the gate of each of the FETs 13 and 14, so that the current flows back to the inductors 21 and 22 while the FETs 11 and 12 are turned off.

Ripple current flowing through the inductors 21 and 22 with the configuration described above (hereinafter simply referred to as ripple current unless there is a risk of mix-up) will be described.

Figure 2:
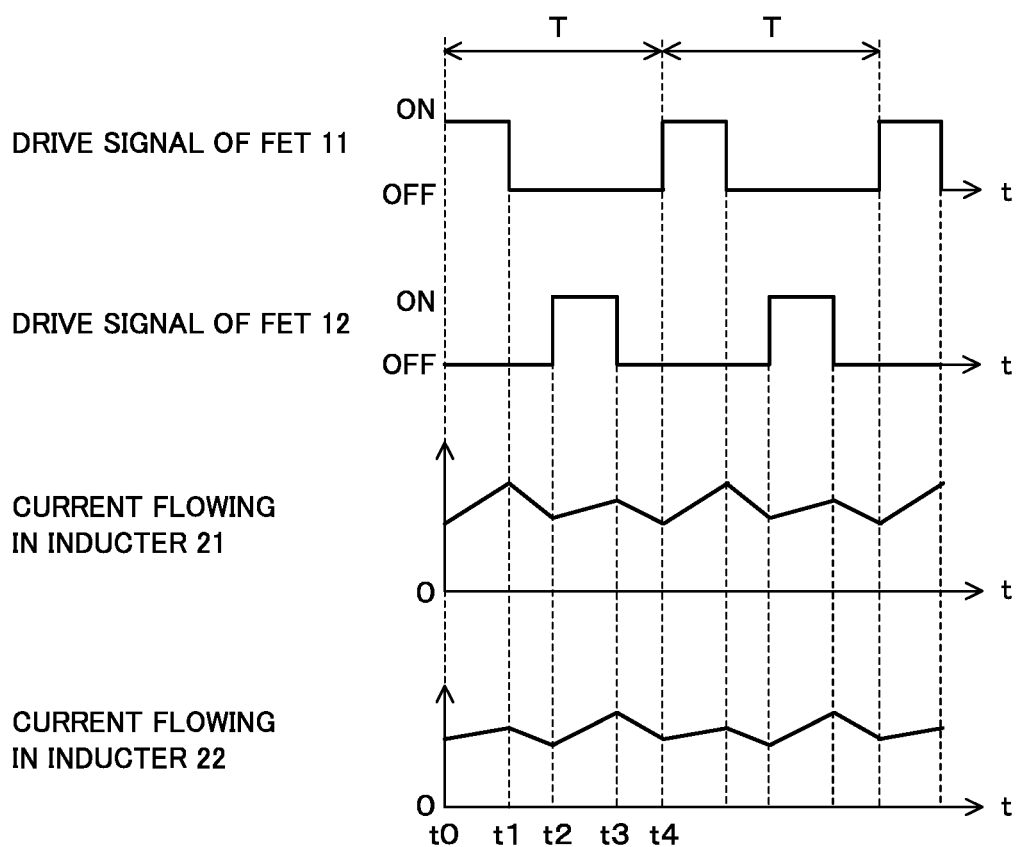
FIG. 2 is a timing chart illustrating the timing relationship between drive signals of FETs and current flowing through inductors in the voltage conversion device according to Embodiment 1.

FIG. 2 is a timing chart illustrating the timing relationship between drive signals of the FETs 11, 12 and current flowing through the inductors 21, 22 in the voltage conversion device according to Embodiment 1. The four timing charts illustrated in FIG. 2 take the same time axis (t) as the horizontal axis, and indicate, from the top, drive signal of the FET 11, drive signal of the FET 12, current flowing in the inductor 21 and current flowing in the inductor 22. A variation component in the current flowing through the inductors 21 and 22 corresponds to ripple current. A duty ratio at which the control unit 50a turns on the FETs 11 and 12 (hereinafter simply referred to as duty ratio unless there is a risk of mix-up) is approximately 30%, for example.

Each signal and each current have cycles of T. The time at which the drive signals of the FETs 11 and 12 rise in the first cycle are assumed as t0 and t2, respectively, while the time at which the drive signals thereof fall are assumed as t1 and t3, respectively. The time after one cycle from the time t0 is assumed as t4. The drive signals of the FETs 11 and 12 have phases shifted from each other by π. That is, the time period from the time t0 to the time t2 corresponds to T/2. The drive signal (not illustrated) of the FET 13 has inverted phase of on and off from the drive signal of the FET 11. That is, the drive signal of the FET 11 is off when the drive signal of the FET 13 is on, while the drive signal of the FET 11 is on except for a so-called dead time when the drive signal of the FET 13 is off. Likewise, the drive signal (not illustrated) of the FET 14 has inverted phase of on and off from the drive signal of the FET 12.

From the time t0 to t1, the FET 11 is turned on, and current flows from the power supply 2 through the inductor 21 to the capacitor 32 and the load 3. During this period, energy is inputted from the power supply 2 to the inductor 21, which increases current in the inductor 21. Though the other FET 12 is turned off, current is induced to the inductor 22 so as to cancel out the current flowing in the inductor 21, which increases current in the inductor 22 as time passes. This current flows back from the capacitor 32 and the load 3 through the FET 14.

From the time t1 to t2, the FET 11 is turned off, and the current flowing in the inductor 21 flows back through the FET 13. Moreover, the current flowing in the inductor 22 still flows back through the FET 14. During this period, no energy is inputted from the power supply 2 to the inductor 21, which reduces current in both of the inductors 21 and 22.

From the time t2 to t3, the FET 12 is turned on, and current flows from the power supply 2 through the inductor 22 to the capacitor 32 and the load 3. The increased amount of current flowing through the inductor 22 during this period is equal to the increased amount of current in the inductor 21 during the period from time t0 to t1. Though the other FET 11 is turned off, current is induced to the inductor 21 so as to cancel out the current flowing in the inductor 22, which increases the current in the inductor 21 as time passes. This current flows back from the capacitor 32 and the load 3 through the FET 13.

From the time t3 to t4, the FET 12 is turned off, and the current flowing in the inductor 22 flows back through the FET 14. Moreover, the current flowing in the inductor 21 still flows back through the FET 13. During this period, no energy is inputted from the power supply 2 to the inductors 21 and 22, which reduces current in both of the inductors 21 and 22. The variations in each signal and current in cycles from time t4 on are similar to those in the cycle from time t0 to t4.

Here, assuming the case where no magnetic coupling occurs between the inductors 21 and 22, that is, where the coupling coefficient k between the inductors 21 and 22 is 0, an increased amount ΔiL of the current flowing in the inductor 21 during the period from t0 to t1 is represented by the following equation (1). The reduced amount of current flowing in the inductor 21 during the period from time t1 to t4 has the same absolute values as the equation (1) but different signs.

$$\Delta iL = \{(Vin - Vout)/L1\} D \cdot T \tag{1}$$

where
  Vin: input voltage of voltage conversion circuit 1a (=voltage of power supply 2)
  Vout: output voltage of voltage conversion circuit 1a
  L1: self inductance of inductor 21
  D: duty ratio at which control unit 50a turns on FET 11
  T: cycle of drive signal of FET 11

Since the relationship between the input voltage Vin and the output voltage Vout in the voltage conversion circuit 1a is represented by the equation (2) below, the left side of the equation (2) is substituted for the right side of the equation (1) to obtain the equation (3) below which is deformed from the equation (1).

$$Vout = D \cdot Vin \tag{2}$$

$$\Delta iL = \{(Vin(1-D))/L1\} D \cdot T \tag{3}$$

The equation (3) represents that ripple current in the inductor 21 is inversely proportional to the self inductance L1. According to the equation (3), ΔiL is 0 if the duty ratio is 0 or 1, whereas ΔiL is maximum if the duty ratio is 0.5.

On the other hand, if the coupling coefficient k between the inductors 21 and 22 is in the range of 0<k<1, a component serving as a choke coil by substituting for the self inductance L1 in the equation (1), out of the inductance components of the inductor 21, corresponds to leakage inductance Le1 (see FIG. 6), which will be described later. In the description below, the leakage inductance concerning the inductors 21, 22 or two substitute inductors will simply be referred to as leakage inductance. The ripple current of the inductor 21 generated in the case where the self inductance L1 in the equation (1) is substituted by the leakage inductance Le1 of the same magnitude is smaller than the case where k=0, since it is repeatedly increased or decreased more frequently than the case where k=0, as illustrated in FIG. 2.

Particularly when k is as close to 1 as possible, at the duty ratio of 0.5, the current flowing in the inductor 21 during a period where the FET 11 is turned on coincides with the current induced to the inductor 21 by the FET 12 during a period where the FET 11 is turned off, which reduces the ripple current of the inductor 21 to the minimum. It is apparent that the ripple current of the inductor 21 is 0 when the duty ratio is 0 or 1, as in the case where k=0.

In view of the discussion above, a simulation result for the relationship between the duty ratio and the ripple current will be described.

Figure 3:
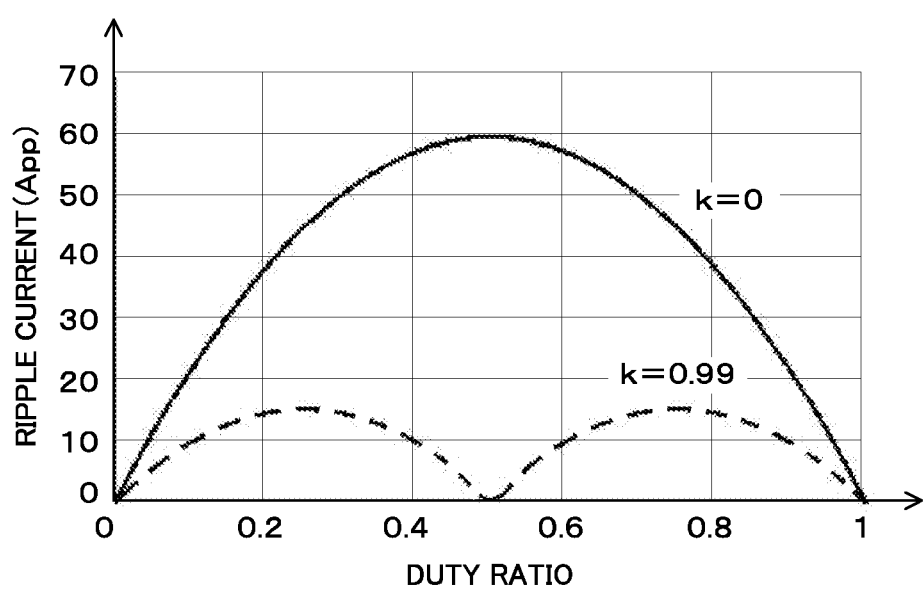
FIG. 3 is a graph illustrating the relationship between a duty ratio and ripple current in the case where the leakage inductance is 2 µH.
Figure 4:
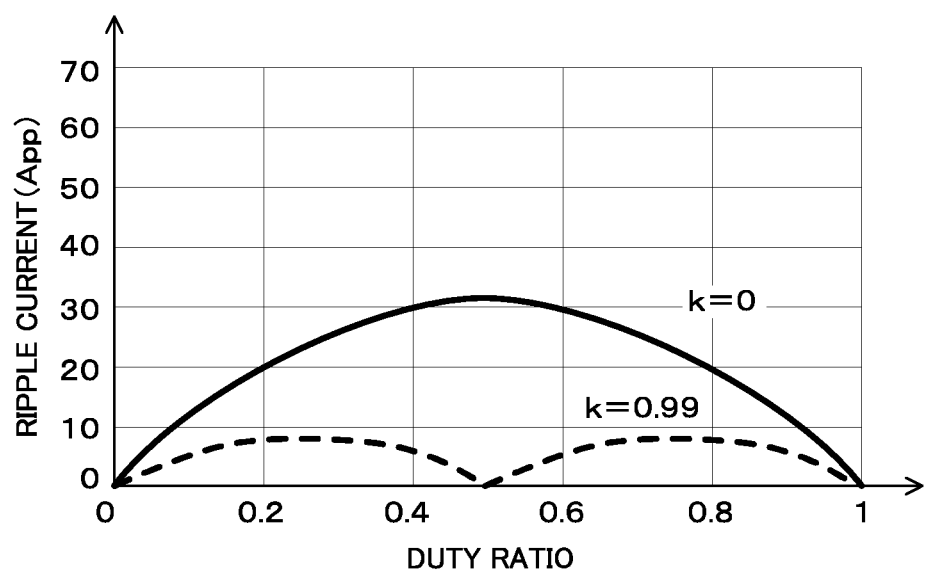
FIG. 4 is a graph illustrating the relationship between a duty ratio and ripple current in the case where the leakage inductance is 4 µH.

FIG. 3 is a graph illustrating the relationship between a duty ratio and ripple current in the case where the leakage inductance is 2 µH. FIG. 4 is a graph illustrating the relationship between a duty ratio and ripple current in the case where the leakage inductance is 4 µH. In each of FIGS. 3 and 4, the horizontal axis represents the duty ratio whereas the vertical axis represents ripple current (App: Ampere peak-to-peak).

In FIGS. 3 and 4, the solid lines and broken lines indicate the change characteristics of ripple current with respect to the duty ratio in the case where the coupling coefficients k are 0 and 0.99, respectively. While the leakage inductance may be referred to as "self inductance" if k=0, the term "leakage inductance" is used here. As discussed above, the ripple current generated if k=0 is maximum at the duty ratio of 0.5, forming an upward convex curve. On the other hand, the ripple current generated if k=0.99 is minimum of approximately 0 at the duty ratio of 0.5, forming curves where the ripple current is maximum at a duty ratio between 0 and 0.5 as well as between 0.5 and 1.

Comparing the cases indicated by solid lines in FIGS. 3 and 4, if k=0, the ripple current is reduced to half over the entire range of duty ratio when the leakage inductance is doubled from 2 µH to 4 µH. Likewise, comparing the cases indicated by broken lines, if k=0.99, the ripple current is reduced to half over the entire range of duty ratio when the leakage inductance is doubled from 2 µH to 4 µH. That is, it can be said that the ripple current and the leakage inductance are inversely proportional to each other.

The relationship among the core 20, the inductors 21 and 22 will now be described in detail.

Figure 5:
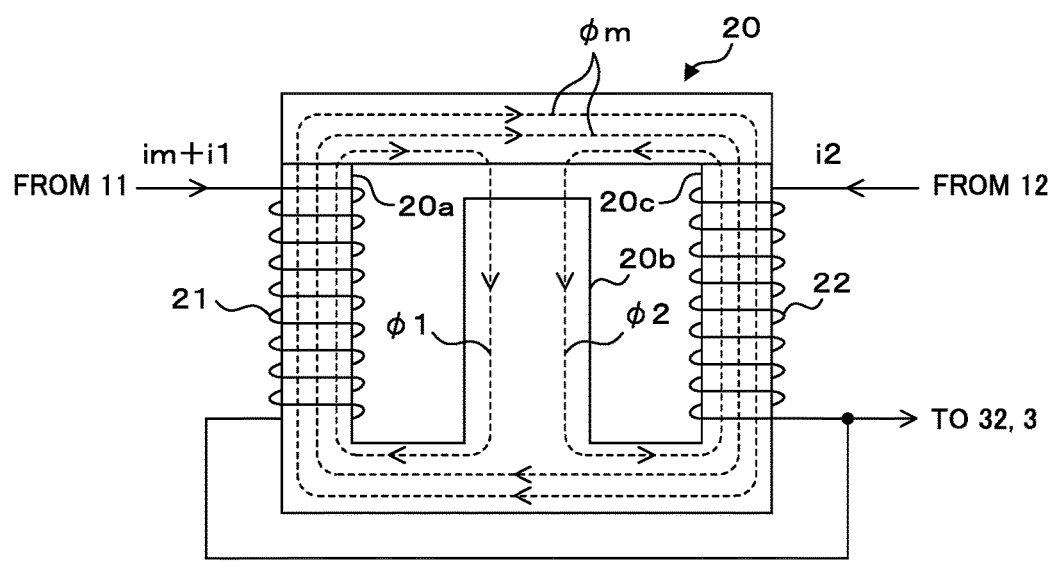
FIG. 5 is an explanatory diagram illustrating magnetic fluxes interlinking with inductors through a core.
Figure 6:
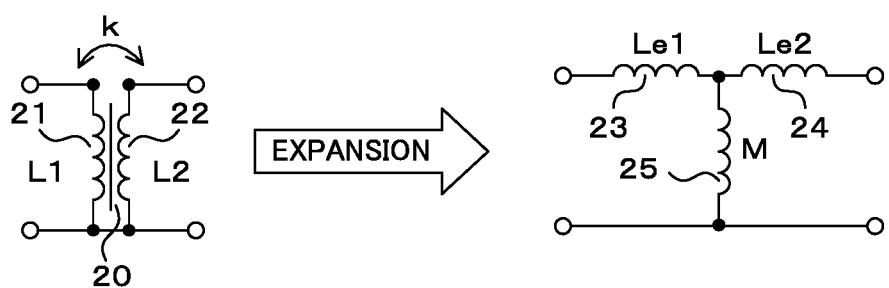
FIG. 6 is a circuit diagram illustrating an equivalent circuit of an inductor.
Figure 7:
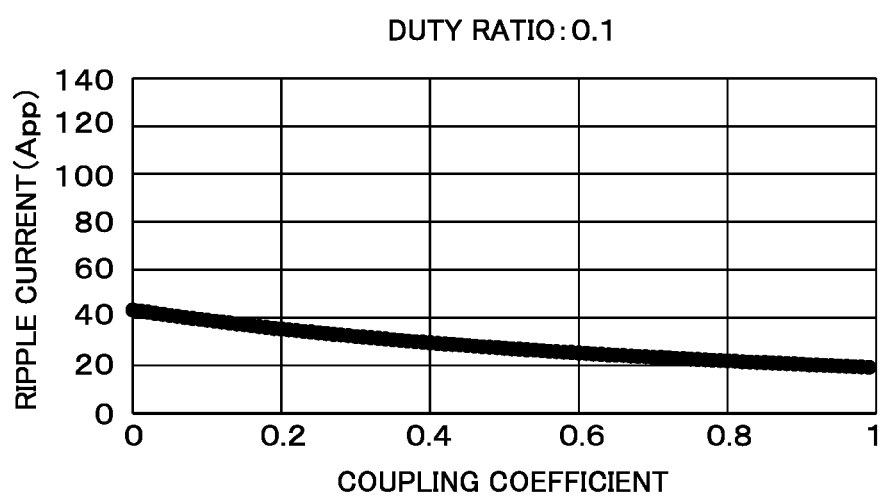
FIG. 7 is a graph illustrating the relationship between a coupling coefficient and ripple current in the case where the leakage inductance is 1 µH.
Figure 9:
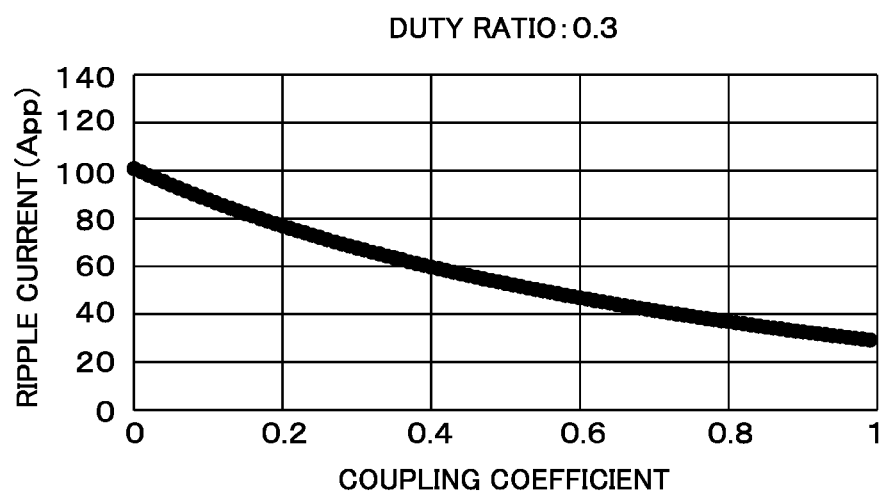
FIG. 9 is a graph illustrating the relationship between a coupling coefficient and ripple current in the case where the leakage inductance is 1 µH.
Figure 10:
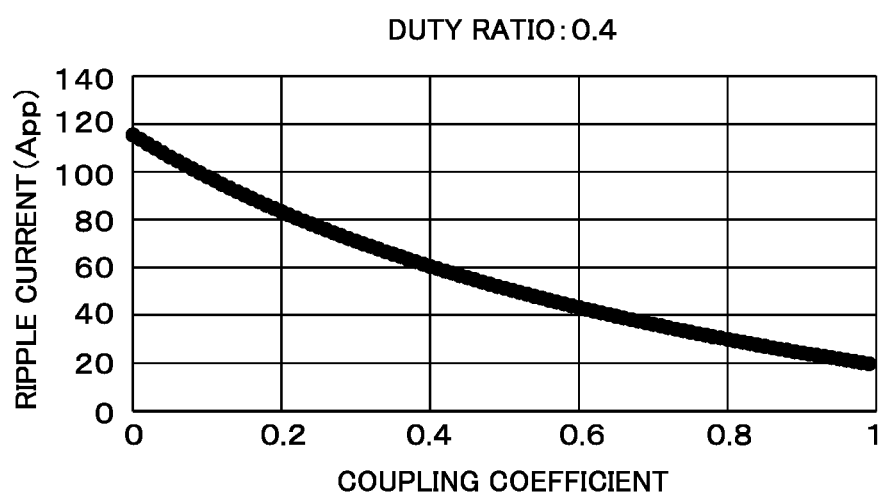
FIG. 10 is a graph illustrating the relationship between a coupling coefficient and ripple current in the case where the leakage inductance is 1 µH.
Figure 11:
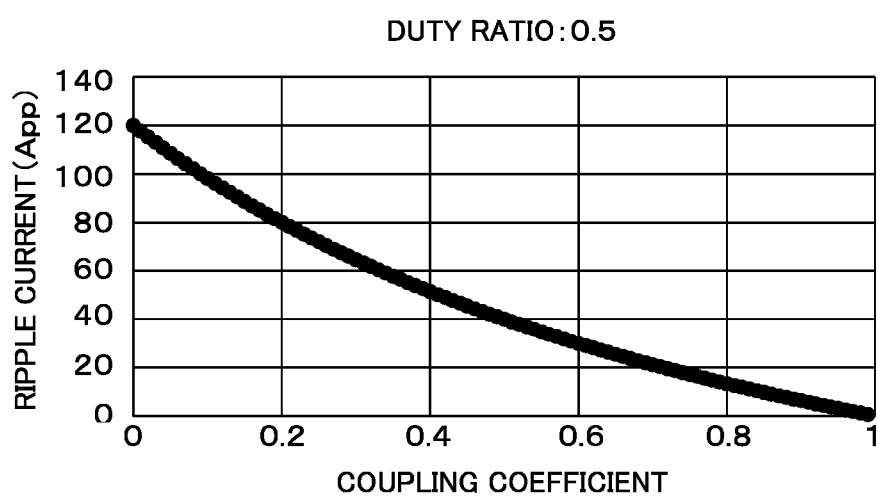
FIG. 11 is a graph illustrating the relationship between a coupling coefficient and ripple current in the case where the leakage inductance is 1 µH.
Figure 19:
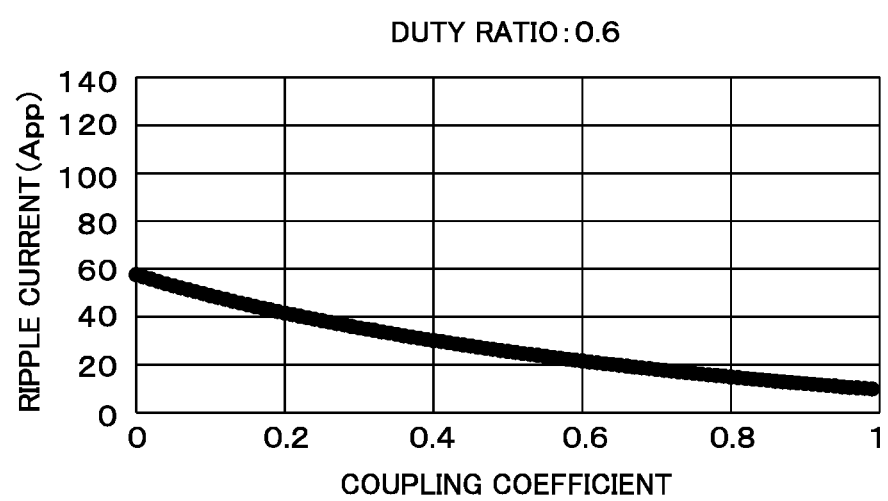
FIG. 19 is a graph illustrating the relationship between a coupling coefficient and ripple current in the case where the leakage inductance is 2 µH.
Figure 20:
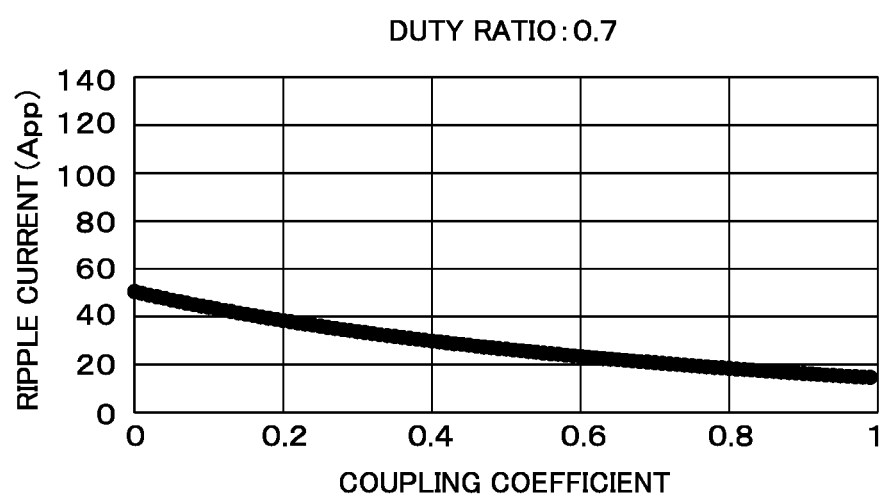
FIG. 20 is a graph illustrating the relationship between a coupling coefficient and ripple current in the case where the leakage inductance is 2 µH.

FIG. 5 is an explanatory diagram illustrating magnetic fluxes interlinking with the inductor 21 and/or the inductor 22 through the core 20. FIG. 6 is a circuit diagram illustrating an equivalent circuit of the inductors 21 and 22. The core 20 illustrated in FIG. 5 is a so-called EI core, and a gap is formed at a middle leg 20b between a part of the core 20 having an E shape and another part of the core 20 having an I shape. The core 20 is not limited to the EI core. The inductors 21 and 22 are wound around a leg 20a on one side of the core 20 and a leg 20c on the other side thereof, respectively.

Referring now to FIG. 6, the self inductance of the inductors 21 and 22 correspond to L1 and L2, respectively, while the coupling coefficient between the inductors 21 and 22 is k. When expanding it to an equivalent circuit, the inductors 21 and 22 are represented by a three-terminal circuit in which one end of each of the inductors 23 and 24 corresponding to the leakage inductance Le1 and Le2 is connected to one end of the inductor 25 corresponding to mutual inductance M. Le1 and Le2 are represented by the following equations (4) and (5).

$$Le1=(1-k)L1 \quad (4)$$

$$Le2=(1-k)L2 \quad (5)$$

The coupling coefficient k and the mutual inductance M are defined by the same sign, and whether k and M are positive or negative depends on the direction of magnetic coupling between the inductors 21 and 22. In general, since k is defined to have a positive sign irrespective of the direction of magnetic coupling, the following description will be made assuming that k is represented by 0 or a positive number. Any case where k should actually be represented by 0 or a negative number may be recognized from dots applied to one end of each of the inductors 21 and 22 indicating that the directions of magnetic coupling are opposite from each other.

More specifically, in the case where current flows into one ends with dot signs of two inductors that are coupled to each other, if the magnetic fluxes are intensified (or weakened) with each other, the mutual inductance M is defined to have a positive (or negative) sign. Thus, it can be seen from the drawing that, in the case where the signs of the coupling coefficient k between the inductors 21 and 22 illustrated in FIG. 1 as well as the mutual inductance M are defined as positive, the magnetic fluxes are weakened when current flows into one end of each of the inductors 21 and 22 from the source of each of the FETs 11 and 12. This clarifies that the directions of mutual magnetic coupling of the inductors 21 and 22 are opposite from each other.

To precisely illustrate FIG. 1 by defining that the coupling coefficient k and mutual inductance M have a negative sign, dots are applied to one ends of the inductors 21 and 22 connected to the respective sources of the FETs 11 and 12, which makes it difficult to grasp that the directions of magnetic coupling are opposite from each other, and thus such illustration is not employed here.

Referring again to FIG. 5, in the case where voltage is applied from the FET 11 to one end of the inductor 21, excitation current im flows in the inductor 21, generating a main magnetic flux Φm in the core 20 due to the excitation inductance corresponding to the mutual inductance M. The main magnetic flux Φm interlinks with the inductor 22 so that load current i2 flows by electromagnetic induction and load current i1 flows to the inductor 21 according to the load current i2.

Here, winding current (i1+im) by the inductor 21 causes a leakage magnetic flux Φ1 not interlinking with the inductor 22, and winding current (i2) by the inductor 22 causes a leakage magnetic flux Φ2 not interlinking with the inductor 21. The leakage magnetic fluxes Φ1 and Φ2 pass through the leg 20b at the middle of the core 20. Using the leakage inductance Le1 and Le2 as described above, the leakage magnetic fluxes Φ1 and Φ2 are represented by the following equations (6) and (7).

$$\Phi1=Le1(i1+im) \quad (6)$$

$$\Phi2=Le2\cdot i2 \quad (7)$$

While the main magnetic flux Φm is not increased by the load current i1 and i2, leakage magnetic fluxes Φ1 and Φ2 are increased respectively in proportion to the load current i1 and i2. Thus, in the case where the load current i1 and i2 are constant, the equations (6) and (7) indicate that the magnetic flux (magnetic flux density) Φ in the core 20 is proportional to the leakage inductance Le1 and Le2. It is assumed in the description below that comparison is made while the load current i1 and i2 are set to be constant. Since the magnetic flux Φ is represented by the product of magnetic density B in the core 20 and an effective sectional area Ae of the core 20, if the magnetic density B in the core 20 is constant, the effective sectional area Ae and the leakage inductance Le1 and Le2 may bear a proportional relationship.

In general, the magnetic flux density in the core cannot exceed the maximum magnetic flux density Bmax. In view of this, when, for example, the size of the core is reduced without changing the shape thereof, the leakage inductance may be lowered by a rate at which the effective sectional area is reduced, based on the proportional relationship described above, in order to reduce the effective sectional area of the core without changing the magnetic flux density of the core. There is, however, a dilemma where ripple current is increased by lowering the leakage inductance in order to reduce the size of the core, since the ripple current and leakage inductance are inversely proportional to each other as described above.

To find ways to reduce the size of the core in a range where the ripple current of the inductor is less increased compared to the case where the coupling coefficient k is 0, graphs are plotted that indicate the changes in ripple current in the case where two inductors with constant leakage inductance and varied coupling coefficients are used.

FIGS. 7 to 13 are graphs illustrating the relationship between coupling coefficients and ripple current in the case where the leakage inductance is 1 μH. FIGS. 14 to 20 are graphs illustrating the relationship between coupling coefficients and ripple current in the case where the leakage inductance is 2 μH. In each of the drawings, the horizontal axis represents coupling coefficients whereas the vertical axis represents ripple current (App). FIGS. 7, 8, 9, 10, 11, 12 and 13 as well as FIGS. 14, 15, 16, 17, 18, 19 and 20 illustrate changes in ripple current depending on the coupling coefficients for the cases where the duty ratios are 0.1, 0.2, 0.3, 0.4, 0.5, 0.6 and 0.7, respectively. Here, the voltage of the power supply 2 is 48V, whereas the cycle T is 10 μs (frequency of 100 kHz).

It can be seen from any one of FIGS. 7 to 20 that ripple current is more reduced as the coupling coefficient is larger. Focusing on this point, one graph is plotted based on the graphs illustrated in FIGS. 14 to 20 in order to evaluate how the ripple current changes when the duty ratio is changed in the case where the leakage inductance is 2 μH.

Figure 21:
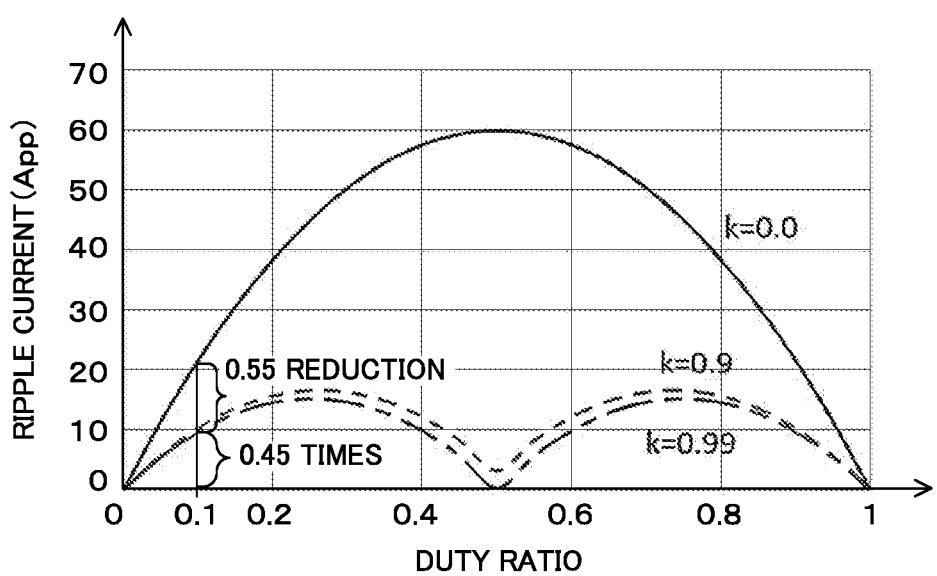
FIG. 21 is a graph illustrating the relationship between a duty ratio and ripple current in the case where the leakage inductance is 2 µH.

FIG. 21 is a graph illustrating the relationship between a duty ratio and ripple current in the case where the leakage inductance is 2 μH. In the drawing, the horizontal axis represents a duty ratio whereas the vertical axis represents ripple current (App). The solid line, broken line and dashed-dotted line indicate the change characteristics of the ripple current with respect to the duty ratio when the coupling coefficients k are 0.0, 0.9 and 0.99, respectively. As described above, it is apparent that the ripple current is more reduced as the coupling coefficient k is larger, and thus no graph is plotted for the cases where the coupling coefficient k is larger than 0.0 and smaller than 0.9.

When seen from another perspective, the solid line in FIG. 21 indicates the first change characteristic of the ripple current for the duty ratio in the range from 0 to 1 that is obtained using two first inductors with the leakage inductance (corresponding to self inductance in practice) of 2 μH and the coupling coefficient k of 0. Moreover, the broken line or dashed-dotted line in FIG. 21 indicate the second change characteristic of the ripple current for the duty ratio in the range from 0 to 1 that is obtained using two second inductors with the leakage inductance of the same magnitude as the self inductance of the first inductor and k close to −1. These change characteristics are successively compared with one another across a certain range of duty ratio, and the lowest reduction rate for the ripple current of the second change characteristic to the ripple current of the first change characteristic may be calculated based on the values read from FIG. 21.

It has been found here, as described above, that the ripple current is inversely proportional to the leakage inductance and that the effective sectional area of the core is reduced by the amount the leakage inductance is reduced while the magnetic density in the core is made constant. Accordingly, the rate at which the ripple current is increased by reducing the leakage inductance of the second inductance by the amount corresponding to the reduction rate calculated by reading values from FIG. 21 and the rate at which the ripple current is reduced by changing k from 0 to 0.99 may be canceled out. It is thus possible to reduce the size of the core without changing the magnetic flux density within the core in a range where the ripple current of the inductor is less increased compared to the case where the coupling coefficient k is 0.

More specifically, if, for example, the duty ratio is changed from 0.1 to 0.7 in FIG. 21, the rate of reducing the ripple current when the coupling coefficient k is changed from 0 to 0.99 is the lowest when the duty ratio is 0.1, the reduction rate here being 0.55. In other words, the ripple current is reduced to only 0.45 times by changing k from 0 to 0.99 with the duty ratio of 0.1, whereas the ripple current is more reduced to less than 0.45 times with the other duty ratios. Thus, by reducing the leakage inductance to 0.9 μH which is 0.45 times of 2 μH and by setting the coupling coefficient k to 0.99, it is possible to less increase the ripple current for the duty ratio in the range from 0.1 to 0.7, compared to the case where k is 0. By reducing the leakage inductance to 0.45 times (reduction rate of 0.55), the size (effective sectional area) of the core may also be 0.45 times without changing the magnetic flux density in the core.

Effects on ripple current will now be described that is caused by the reduction in the leakage inductance and the change of k from 0 to 0.99.

Figure 22:
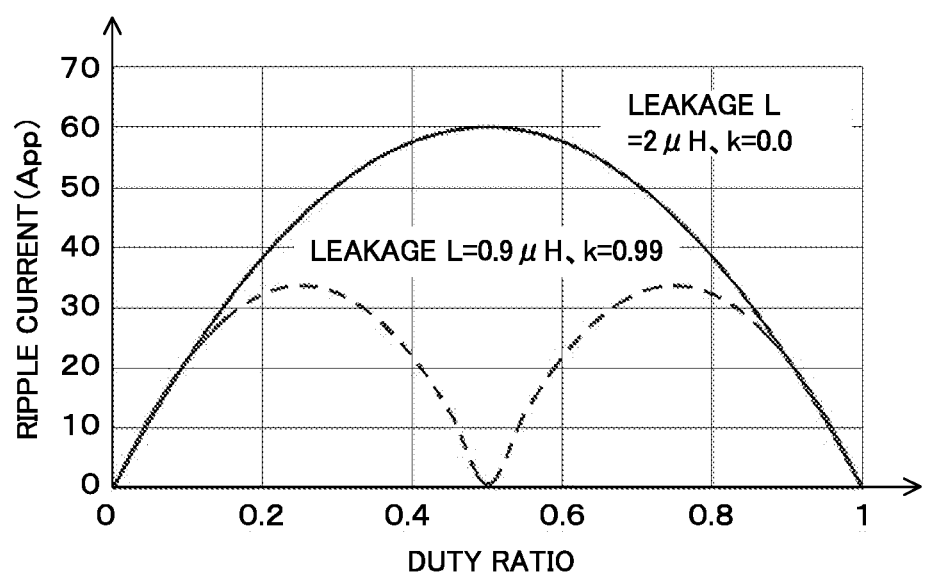
FIG. 22 is a graph illustrating the relationship between a duty ratio and ripple current before and after reduction in the leakage inductance.

FIG. 22 is a graph illustrating the relationship between a duty ratio and ripple current before and after the leakage inductance is reduced. In the drawing, the horizontal axis represents a duty ratio whereas the vertical axis represents ripple current (App). The solid line in the drawing indicates the change characteristic of ripple current with respect to the duty ratio at a time when the leakage inductance (leakage L) is 2 μH and k=0. This solid line is exactly the same as that in FIG. 21. Furthermore, the broken line indicates the change characteristic of ripple current with respect to the duty ratio at a time when the leakage inductance is 0.9 μH and k=0.99.

The ripple current indicated by the broken line shows a curve where it is minimized to approximately 0 when the duty ratio is 0.5, and is maximized when the duty ratio is between 0 and 0.5 as well as between 0.5 and 1, as in the cases shown in FIGS. 3 and 4. Referring to FIG. 22, even in the case where the leakage inductance is reduced from 2 μH to 0.9 μH and k is changed from 0 to 0.99, the increase in ripple current is suppressed across the range of a duty ratio of at least from 0.1 to 0.7.

A confirmation result of the effect of reducing the size of the core will now be described.

FIG. 23 is a table illustrating the volume of the core actually measured for the coupling coil in the case where the leakage inductance is 0.9 µH. Here, four types of coupling coils A, B, C and D are experimentally produced, with the leakage inductance of 0.9 µH obtained by coupling two inductors through a core, to have coupling coefficients of 0.78, 0.86, 0.96 and 0.98, respectively, and the effect of reduction in the size of the core is confirmed by actually measuring the volume of the core.

As a result of the measurement, the values of the volume of the cores for the coupling coils A, B, C and D are 22 cm$^3$, 24 cm$^3$, 23 cm$^3$ and 21 cm$^3$, respectively. Meanwhile, as for a reference coupling coil with the leakage inductance of 2.0 µH and k=0, which is used for reference in comparison, the volume of the core is 38 cm$^3$. It can be said from these results that the effect of sufficiently reducing the size of the core may be obtained over a wide range where k is from 0.78 to 0.98.

Finally, ripple current generated in the case where the coupling coils A, B, C and D are used will be described.

Figure 24:
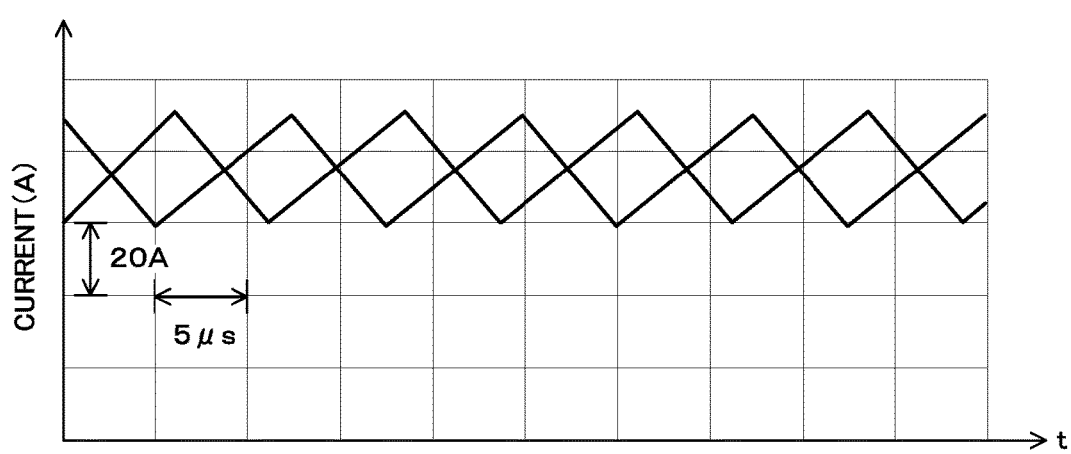
FIG. 24 is a graph illustrating waveforms of ripple current in the case where a reference coupling coil is used.
Figure 25:
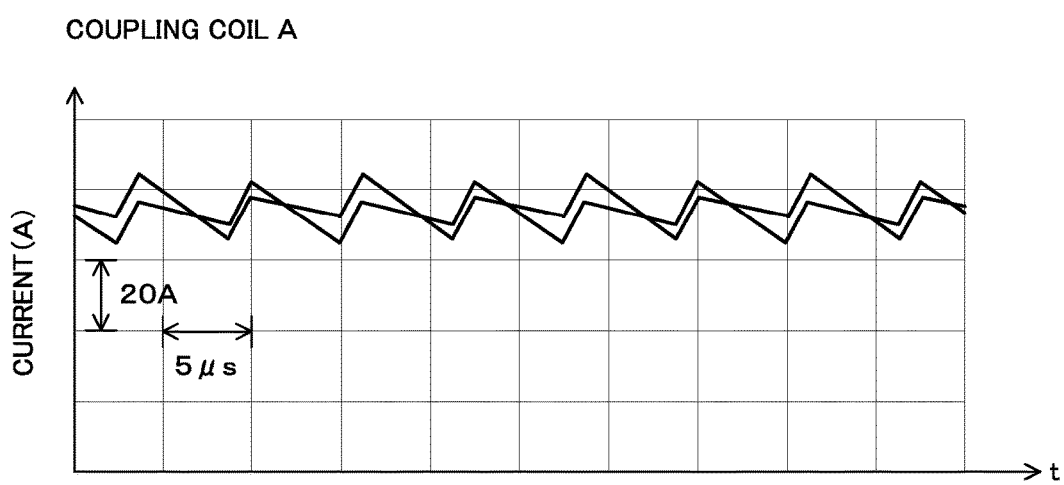
FIG. 25 is a graph illustrating waveforms of ripple current in the case where a coupling coil A is used.
Figure 26:
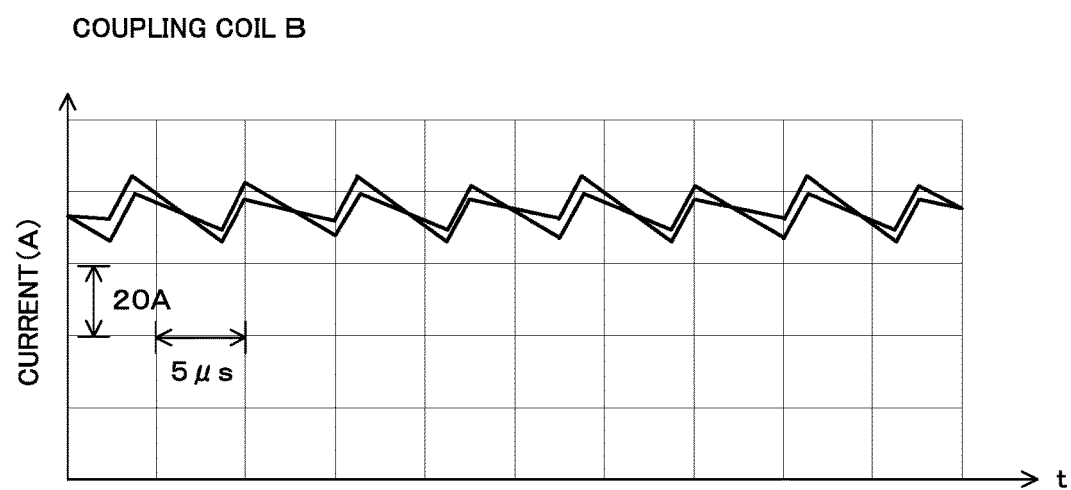
FIG. 26 is a graph illustrating waveforms of ripple current in the case where a coupling coil B is used.
Figure 27:
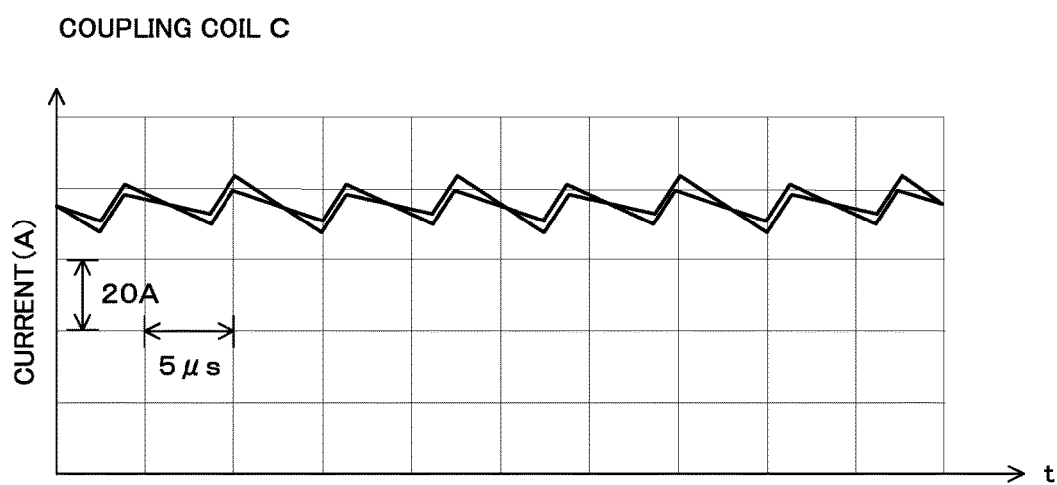
FIG. 27 is a graph illustrating waveforms of ripple current in the case where a coupling coil C is used.
Figure 28:
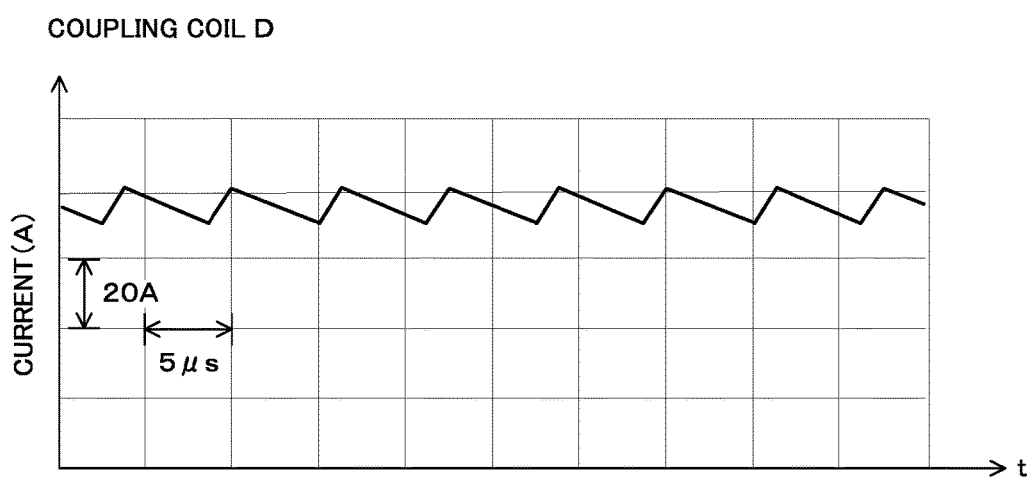
FIG. 28 is a graph illustrating a waveform of ripple current in the case where a coupling coil D is used.

FIG. 24 is a graph illustrating waveforms of ripple current in the case where a reference coupling coil is used. FIGS. 25, 26, 27 and 28 are graphs illustrating waveforms of ripple current in the cases where coupling coils A, B, C and D are used, respectively. In each of the drawings, the horizontal axis represents time (t) whereas the vertical axis represents current (A) in the inductor 21 or 22. The time scale of 5 µs which is a reference of the horizontal axis and the current scale of 20 A which is a reference of the vertical axis are indicated at appropriate positions in FIGS. 24 to 28. As for the measurement conditions, the input voltage is 24V, the output current is approximately 70 A, the frequency is 80 kH and the duty ratio is 0.6.

Since the magnitude of current amplitude matters here, FIGS. 24 to 28 illustrate waveforms of ripple current in two inductors included in the coupling coils without distinguishing one from another. It can be found from these drawings that the phases of the waveforms of two kinds of ripple current are shifted from each other by π. It can further be seen that the ripple current illustrated in FIGS. 25 to 28 is suppressed to be equal to or lower than the ripple current shown in FIG. 24.

While the reduction rate of ripple current generated when k is changed from 0 to 0.99 (−0.99 in practice) is calculated using FIG. 21, it is not always necessary to increase k up to 0.99. It is apparent from the description above that the reduction rate of ripple current is larger as k is closer to 1 (−1 in practice), and the size of the core 20 may be reduced at a larger rate as the ripple current is reduced at a larger rate.

As described above, according to Embodiment 1, the control unit 50a alternately turns on and off the FETs 11 and 12 in the voltage conversion circuit 1a so that the FETs 11 and 12 switch the current flowing through the inductors 21 and 22 that are wound around the core 20 and that magnetically cancel each other out, and thus the voltage inputted to the voltage conversion circuit 1a is converted and outputted. For the inductors 21 and 22, the coupling coefficient k which is closely related to the leakage inductance Le1 and Le2 is within the range of 0.99≥k≥0.78 (−0.99≤k≤−0.78 in practice).

That is, in a range where the ripple current in the inductors 21 and 22 is less increased compared to the case where the coupling coefficient k between the two inductors is 0, k may be closer to −1 than the conventional case (−0.4<k≤−0.1 as described in Patent Document 2), and the inductors 21 and 22 may be applied, which have respective leakage inductance Le1 and Le2 smaller than the self inductance obtained when k is 0, as k is closer to −1.

Accordingly, the size of the core 20 around which the inductors 21 and 22 that magnetically cancel each other out are wound may be reduced, along with the reduction in the size of the core 20 in accordance with the reduction in the leakage inductance Le1 and Le2.

Moreover, according to Embodiment 1, the current flowing through the inductors 21 and 22 is switched at the duty ratio D in the range of 0.1≤D≤0.7.

Accordingly, the duty ratio higher than the conventional case (D<0.5 as described in Patent Document 1, or 0.05≤D≤0.40 as described in Patent Document 2) may be employed, which may obtain higher output voltage for the same input voltage.

Furthermore, according to Embodiment 1, the first change characteristic of the ripple current for the duty ratio in the range from 0 to 1 that is obtained using two first inductors with the coupling coefficient k of 0 is successively compared with the second change characteristic of the ripple current for the duty ratio in the range from 0 to 1 that is obtained using two second inductors with the leakage inductance of the same magnitude as the self inductance of the first inductors and k close to −1, across the duty ratio in the range from 0.1 to 0.7, and the leakage inductance Le1 and Le2 are decided for the inductors 21 and 22, respectively, in accordance with the reduction rate of the ripple current calculated based on the comparison result.

Thus, the reduction rate of ripple current that is reduced by k being closer to −1 and the increase rate of ripple current that is increased by reducing leakage inductance Le1 and Le2 are canceled out, so that the size of the core 20 may be reduced in accordance with the reduction in leakage inductance Le1 and Le2.

Furthermore, according to Embodiment 1, the first change characteristic is successively compared with the second change characteristic across the duty ratio in the range from 0.1 to 0.7, the lowest reduction rate (=0.45) is calculated for the ripple current in the second change characteristic with respect to the ripple current in the first change characteristic, the leakage inductance for the second inductor is reduced at the calculated reduction rate, and the reduced leakage inductance is decided as the leakage inductance Le1 and Le2 for the inductors 21 and 22, respectively.

As such, the reduction rate of ripple current to be guaranteed in the worst case for the duty ratio in the range from 0.1 to 0.7 is calculated, which allows the ripple current for the duty ratio in the range from 0.1 to 0.7 to be equal to or less than the ripple current generated when two first inductors are used, in the case where the leakage inductance of the second inductor is reduced at the same reduction rate and the leakage inductance for the respective inductors 21 and 22 are decided as leakage inductance Le1 and Le2.

Embodiment 2

While Embodiment 1 described the example where the voltage of the power supply 2 is lowered in the voltage conversion circuit 1a, Embodiment 2 describes an example where the voltage of the power supply 2 is increased in a voltage conversion circuit.

Figure 29:
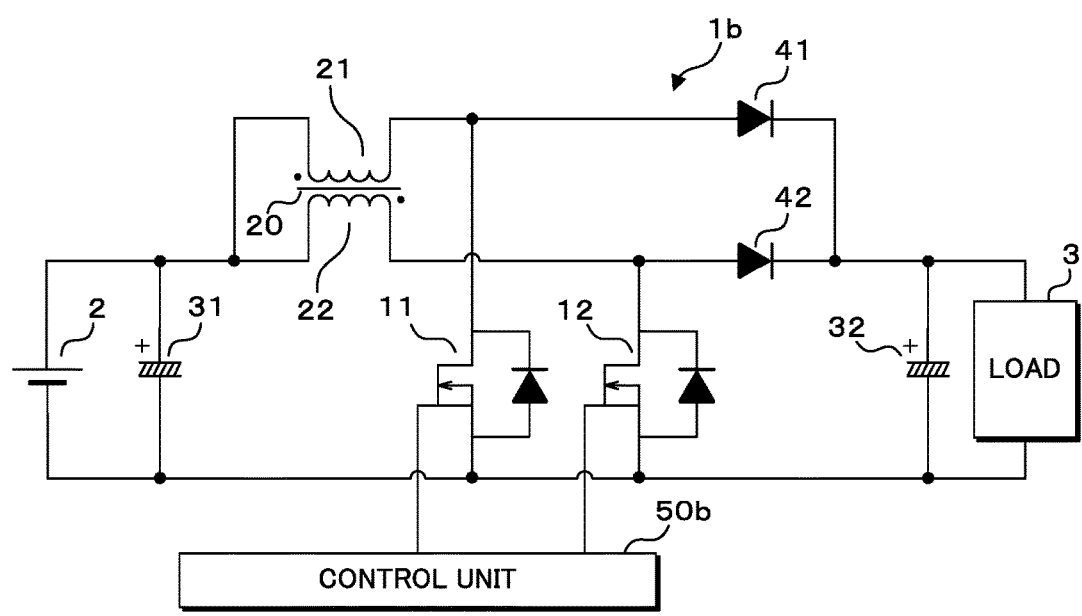
FIG. 29 is a block diagram illustrating a configuration example of a voltage conversion device according to Embodiment 2.

FIG. 29 is a block diagram illustrating a configuration example of a voltage conversion device according to Embodiment 2. The voltage conversion device includes a voltage conversion circuit 1b in which the voltage supplied from an external power supply 2 is raised and supplied to an external load 3, and a control unit 50b that controls conversion of voltage by the voltage conversion circuit 1*b*. Capacitors 31 and 32 are connected in parallel to the power supply 2 and the load 3.

The voltage conversion circuit 1*b* includes inductors 21 and 22 that are wound around a core 20 and that cancel out magnetism caused by the current from the power supply 2, and also includes FETs 11 and 12 that switch current flowing from the power supply 2 through the respective inductors 21 and 22. One end of each of the inductors 21 and 22 is connected to the positive side of the power supply 2. The other end of the inductor 21 is connected to the drain of the FET 11 and to the anode of a diode 41. The other end of the inductor 22 is connected to the drain of the FET 12 and the anode of a diode 42. The gate of each of the FETs 11 and 12 is connected to the control unit 50*b*. The cathode of each of the diodes 41 and 42 is connected to one end of the load 3. The negative side of the power supply 2, the source of each of the FETs 11 and 12, and the other end of the load 3 are connected to a common ground potential.

The control unit 50*b* alternately turns on and off the FETs 11 and 12 by applying drive signals with phases shifted by π to the gate of each of the FETs 11 and 12. The other parts corresponding to those in Embodiment 1 will be denoted by the same reference codes and will not be described here.

Ripple current flowing through the inductors 21 and 22 with the configuration described above (hereinafter simply referred to as ripple current unless there is a risk of mix-up) will be described.

Figure 30:
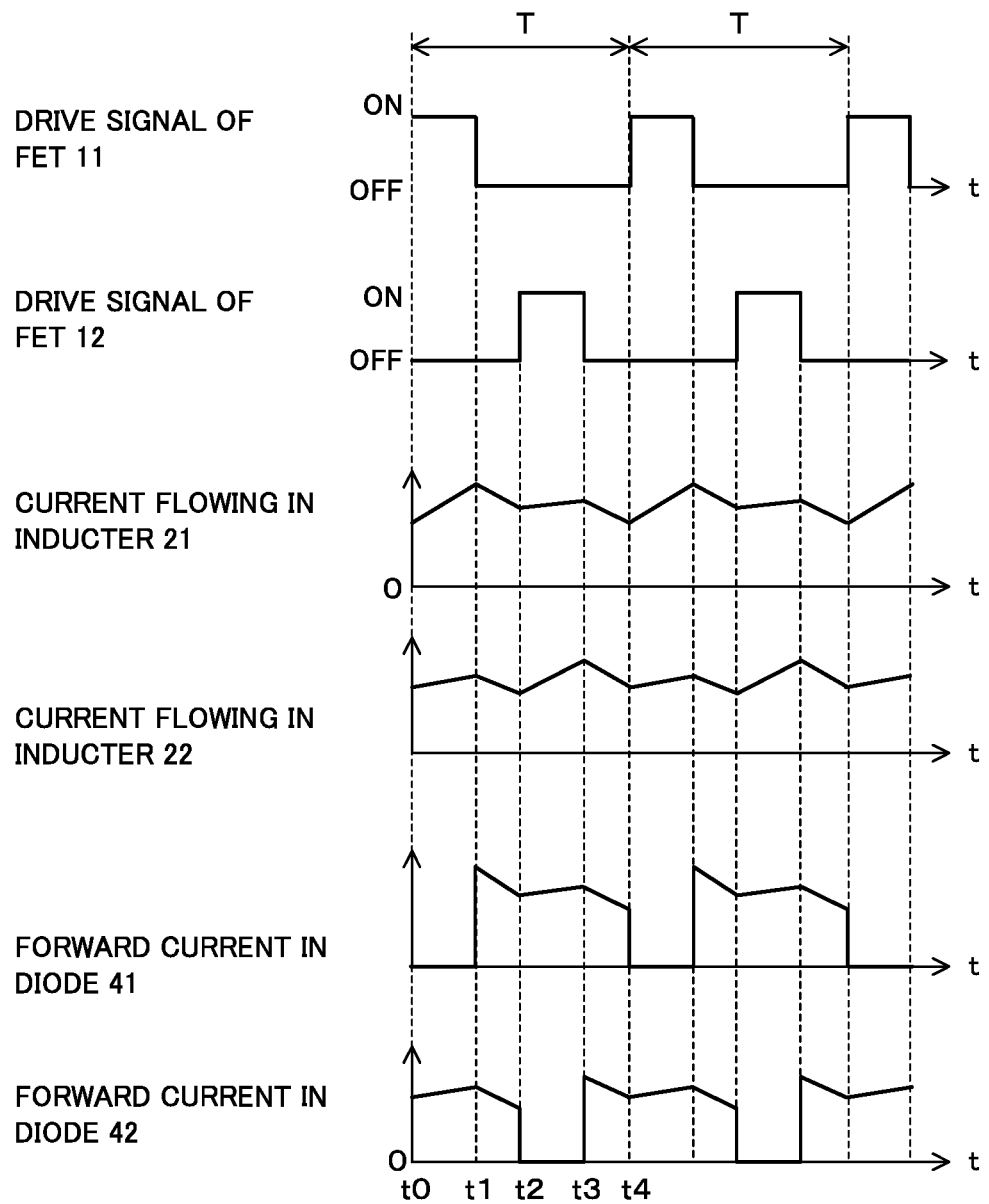
FIG. 30 is a timing chart illustrating the timing relationship between drive signals of FETs and current flowing through components in the voltage conversion device according to Embodiment 2.

FIG. 30 is a timing chart illustrating the timing relationship between drive signals of the FETs 11 and 12 in the voltage conversion device according to Embodiment 2 and current flowing through each component. The six timing charts illustrated in FIG. 6 take the same time axis (t) as the horizontal axis, and indicate, from the top, the drive signal of the FET 11, the drive signal of the FET 12, the current flowing through the inductor 21, the current flowing through the inductor 22, forward current in the diode 41 and forward current in the diode 42. A variation component of the current flowing through the inductors 21 and 22 corresponds to ripple current. The duty ratio at which the control unit 50*b* turns on the FETs 11 and 12 (hereinafter simply referred to as duty ratio unless there is a risk of mix-up) is approximately 30%, for example.

Each signal and each current have the cycle of T. The time at which the drive signals of the FETs 11 and 12 rise in the first cycle are assumed as t0 and t2, respectively, while the time at which the drive signals thereof fall are assumed as t1 and t3, respectively. The time after one cycle from the time t0 is assumed as t4. The drive signals of the FETs 11 and 12 are shifted in phases only by π. That is, the time period from the time t0 to the time t2 corresponds to T/2.

From the time t0 to t1, the FET 11 is turned on, and current flows from the power supply 2 to the inductor 21. During this period, energy is inputted from the power supply 2 to the inductor 21, which increases current in the inductor 21. Though the other FET 12 is off, current is induced to the inductor 22 so as to cancel out the current flowing in the inductor 21, which increases the current in the inductor 22 as time passes. This current flows to the capacitor 32 and load 3 through the diode 42.

From the time t1 to t2, the FET 11 is turned off, and the current flowing in the inductor 21 flows back through the diode 41 as well as the capacitor 32 and the load 3. Moreover, the current flowing in the inductor 22 still flows to the capacitor 32 and the load 3 through the diode 42. During this period, no energy is inputted from the power supply 2 to the inductors 21 and 22, which reduces current in both of the inductors 21 and 22.

From the time t2 to t3, the FET 12 is turned on, and current flows from the power supply 2 to the inductor 22. The increased amount of current flowing through the inductor 22 during this period is equal to the increased amount of current in the inductor 21 flowing during the period from time t0 to t1. Though the other FET 11 is off, current is induced to the inductor 21 so as to cancel out the current flowing in the inductor 22, which increases the current in the inductor 21 as time passes. This current flows to the capacitor 32 and the load 3 through the diode 41.

From the time t3 to t4, the FET 12 is turned off, and the current flowing in the inductor 22 flows back through the diode 42 as well as the capacitor 32 and the load 3. Moreover, the current flowing in the inductor 21 still flows to the capacitor 32 and the load 3 through the diode 41. During this period, no energy is inputted from the power supply 2 to the inductors 21 and 22, which reduces current in both of the inductors 21 and 22. The variations in each signal and current in cycles from time t4 on are similar to those in the cycle from time t0 to t4.

Here, assuming the case where no magnetic coupling occurs between the inductors 22 and 22, that is, where the coupling coefficient k between the inductors 21 and 22 is 0, an increased amount $\Delta iL$ of the current flowing in the inductor 21 during the period from t0 to t1 is represented by the following equation (8). The reduced amount of current flowing in the inductor 21 during the period from time t1 to t4 has the same absolute values as the equation (8) but different signs.

$$\Delta iL = (Vin/L1) D \cdot T \qquad (8)$$

where
  Vin: input voltage of voltage conversion circuit 1*b* (=voltage of power supply 2)
  L1: self inductance of inductor 21
  D: duty ratio at which control unit 50*b* turns on FET 11
  T: cycle of drive signal of FET 11

The equation (8) represents that ripple current of the inductor 21 is inversely proportional to the self inductance L1 and is proportional to the duty ratio.

Meanwhile, if the coupling coefficient k between the inductors 21 and 22 is in the range of 0<k<1, a component out of the inductance components of the inductor 21 that substitutes for the self inductance L1 in the equation (8) and that serves as a choke coil is the leakage inductance Le1 (see FIG. 6). In the description below, the leakage inductance concerning the inductors 21, 22 or two substitute inductors will simply be referred to as leakage inductance. It is easily estimated that the ripple current of the inductor 21 generated in the case where the self inductance L1 in the equation (8) is substituted by the leakage inductance Le1 of the same magnitude is smaller than that in the case where k=0, since it is repeatedly increased or decreased more frequently than the case where k=0 as illustrated in FIG. 30.

Particularly when k is as close to 1 as possible, at the duty ratio of 0.5, the current flowing in the inductor 21 during a period where the FET 11 is turned on coincides with the current induced to the inductor 21 by the FET 12 during a period where the FET 11 is turned off, which reduces the ripple current of the inductor 21 to the minimum.

In Embodiment 2, it is apparent that the ripple current and leakage inductance are inversely proportional to each other, as in Embodiment 1. It can also be seen, as in Embodiment 1, that the effective sectional area of the core and leakage inductance are proportional to each other in the case where the magnetic flux density in the core is constant. Though not illustrated, similarly to Embodiment 1, the ripple current is more reduced as the coupling coefficient k is made closer to 1 with constant leakage inductance.

Thus, as in FIG. 21 of Embodiment 1, graphs are plotted that indicate the first and second change characteristics of ripple current with respect to the duty ratio in the range from 0 to 1 in the case where the coupling coefficients k are 0 and 0.99 with constant leakage inductance. The plotted graphs of the first and second change characteristics are successively compared with each other across the duty ratio in the range from 0.1 to 0.7, and the leakage inductance Le1 and Le2 for the respective inductors 21 and 22 may be decided in accordance with the reduction rate of ripple current calculated based on the comparison result.

Thus, the reduction rate of ripple current that is reduced by k being closer to −1 and the increase rate of ripple current that is increased by reducing leakage inductance Le1 and Le2 are canceled out, so that the size of the core 20 may be reduced in accordance with the reduction in leakage inductance Le1 and Le2.

While only one voltage conversion circuit 1a (or 1b) is included in Embodiment 1 (or 2), the number of voltage conversion circuits 1a (or 1b) is not limited to one but may be N (N is a natural number larger than 1) that are connected in parallel.

In the case of including N voltage conversion circuits 1a (or 1b), the control unit 50a (or 50b) alternately turns on and off the FETs 11 and 12 included in each of the N voltage conversion circuits 1a (or 1b) with a phase difference π, while turning on and off any of the FETs 11 and 12 with phases each shifted by π/N.

That is, all the FETs 11 and 12 included in the N voltage conversion circuits 1a (or 1b) are turned on and off with phases each shifted by 2π/N.

This may uniformly disperse switching losses to N voltage conversion circuits 1a (or 1b) and may also reduce the ripple current contained in the output to 1/N.

Variation Example

Figure 31:
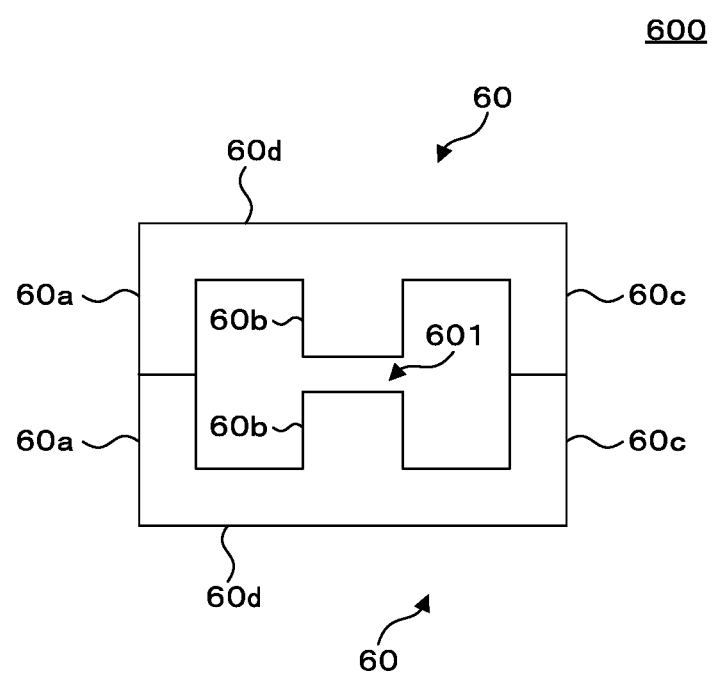
FIG. 31 is a front diagram schematically illustrating an EE-type core of a voltage conversion device according to a variation example.
Figure 32:
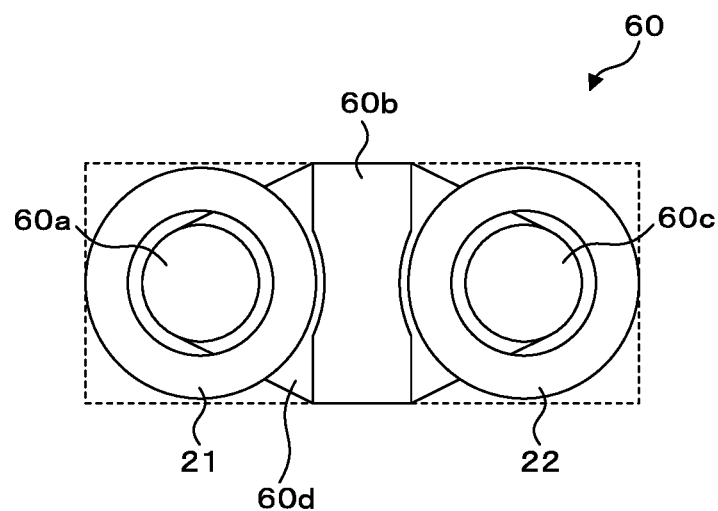
FIG. 32 is a plan diagram schematically illustrating an E-type core onto which inductors are fitted.
Figure 33:
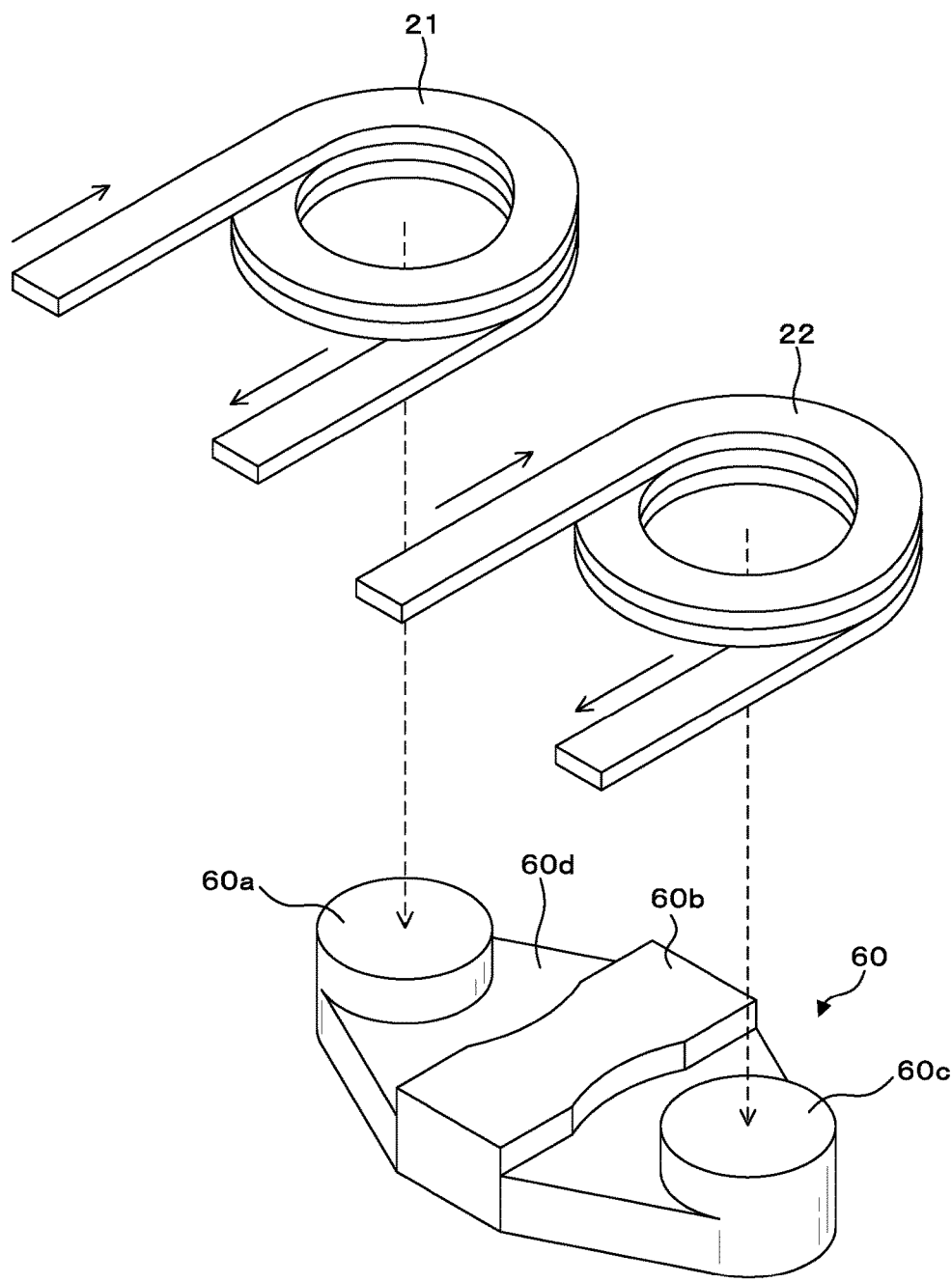
FIG. 33 is an explanatory diagram illustrating a method of assembling an EE-type core by fitting inductors onto the E-type core.

While Embodiments 1 and 2 take forms of using the EI-type core 20, an EE-type core is used in Variation Example. FIG. 31 is a front diagram schematically illustrating an EE-type core 600 of a voltage conversion device according to Variation Example. FIG. 32 is a plan diagram schematically illustrating an E-type core 60 onto which the inductors 21 and 22 are fitted. Moreover, FIG. 33 is an explanatory diagram illustrating a method of assembling the EE-type core 600 by fitting the inductors 21 and 22 onto the E-type core 60.

The EE-type core 600 includes two E-type cores 60 each having a diamond-shaped planar part 60d as well as outer legs 60a, 60c and a middle leg 60b protruding from one surface of the planar part 60d in the vertical direction. The outer legs 60a and 60c of one of the E-type cores 60 are butted with the outer legs 60a and 60c of the other one of the E-type cores 60, respectively. The length of the middle leg 60b of each E-type core 60 is shorter than the length of the outer legs 60a and 60c. Accordingly, in the assembled EE-type core 600, the middle legs 60b and 60b of the two E-type cores 60 and 60 are opposed to each other with a gap 601.

The outer legs 60a and 60c of each E-type core 60 has a cylindrical shape, and has a diameter in the direction crossing the axial direction being a little smaller than the inner diameter of the winding diameter of the inductors 21 and 22.

The middle leg 60b has a wide I shape in plan view, and has a narrowed portion at a part opposed to the outer circumferential sides of the inductors 21 and 22.

Referring to FIG. 33, the inductors 21 and 22 are formed by highly rigid rectangular wire wound around in the same direction for approximately 2.5 turns with the thickness direction being the axis, and are fitted onto the respective outer legs 60a and 60c of one of the E-type cores 60 along the direction of the winding axis indicated by the broken arrows. Thereafter, the other E-type core 60 inverted in the vertical direction is placed over the one E-type core 60. Here, as described above, the outer legs 60a are butted with each other and also the outer legs 60c are butted with each other. In the case where the EE-type core 600 assembled as described above is applied to the voltage conversion device, winding current flows in the direction indicated by the solid arrows, for example, in the inductors 21 and 22.

According to the present variation example, as described above, the EE-type core 600 may be produced from two separate E-type cores 60, eliminating the need for more than one metal mold. Moreover, the outer legs 60a and 60c are formed in a cylindrical shape and the middle leg 60b is provided with a narrowed portion, which can reduce unwanted gaps between the inner circumferential sides of the inductors 21, 22 and the outer legs 60a, 60c, and between the outer circumferential sides of the inductors 21, 22 and the middle leg 60b. Thus, the void ratio of the entire EE-type core 600 onto which the inductors 21, 22 are fitted may be reduced, so that the core size (volume) of the EE-type core 600 may be reduced while maintaining the effective sectional area constant. It is noted that the void ratio here represents the rate of a gap occupying the volume of a rectangular parallelepiped, which is decided by the product of the height of the EE-type core 600 illustrated in FIG. 31, and the width and depth of the EE-type core 600 including the inductors 21 and 22 indicated by the broken lines in FIG. 32.

It is to be noted that, as used herein and in the appended claims, the singular forms "a", "an", and "the" include plural referents unless the context clearly dictates otherwise.

The embodiments disclosed this time are examples in all respects, and should be considered to be not restrictive. The scope of the present invention is not limited to the above-described meaning but is indicated by the claims, and it is intended that all modifications within the meaning and scope equivalent to the claims are included. In addition, the technical features described in the respective embodiments can be combined with each other.

The invention claimed is:

1. A voltage conversion device, comprising:
a voltage conversion circuit including two inductors that are wound around a core and that magnetically cancel each other out, and switching elements that respectively switch current flowing through the two inductors; and
a control unit that alternately turns on and off each of the switching elements,
wherein the two inductors have a coupling coefficient in a range from −0.99 to −0.78 and
a magnitude of leakage inductance of the two inductors corresponds to a value less than one time and 0.45 times or more of a magnitude of self inductance that is required to reduce ripple current flowing through the two inductors at a predetermined reduction rate, in a case where the coupling coefficient of the two inductors is 0.

2. The voltage conversion device according to claim 1,
wherein a duty ratio at which the control unit turns on each of the switching elements is in a range from 0.1 to 0.7.

3. A voltage conversion device, comprising:
a voltage conversion circuit including two inductors that are wound around a core and that magnetically cancel each other out, and switching elements that respectively switch current flowing through the two inductors; and
a control unit that alternately turns on and off each of the switching elements,
wherein the two inductors have a coupling coefficient in a range from −0.99 to −0.78,
the voltage conversion device comprises N sets of the voltage conversion circuits (N is a natural number larger than 1),
the N sets of the voltage conversion circuits are connected in parallel to one another, and
the control unit turns on and off the switching elements of each of the voltage conversion circuits with phases each shifted by $\pi/N$.

4. A method of deciding leakage inductance of two inductors in a voltage conversion device including switching elements that respectively switch current flowing through the two inductors that are wound around a core and magnetically cancel each other out, each of the switching elements being turned on or off by a control unit, comprising:
preparing two first inductors with a coupling coefficient of 0, and two second inductors having leakage inductance of a same magnitude as self inductance of the first inductors and a coupling coefficient close to −1;
connecting the two first inductors in place of the two inductors;
obtaining a first change characteristic with respect to a duty ratio in a predetermined range where the control unit turns on each of the switching elements, for ripple current flowing through the first inductors;
connecting the two second inductors in place of the two first inductors;
obtaining a second change characteristic with respect to the duty ratio in the predetermined range, for ripple current flowing through the second inductors;
calculating a reduction rate of ripple current based on a result obtained by comparing the obtained first and second change characteristics with each other;
setting a reduction rate of the magnitude of leakage inductance of the second inductors to a reduction rate equal to or lower than the calculated reduction rate of ripple current;
deciding a magnitude of leakage inductance of the two inductors so as to obtain the reduction rate; and
setting a coupling coefficient of the two second inductors as a coupling coefficient of the two inductors.

5. The method of deciding leakage inductance according to claim 4, wherein
the calculating of the reduction rate calculates a reduction rate of ripple current at one duty ratio where ripple current is reduced at a lowest rate in the second change characteristic with respect to the first change characteristic,
the reduction rate of the magnitude of leakage inductance of the second inductors is set to a same reduction rate as the calculated reduction rate of ripple current, and
the magnitude of leakage inductance of the two inductors is decided so as to obtain the reduction rate.

6. The voltage conversion device according to claim 3,
wherein a duty ratio at which the control unit turns on each of the switching elements is in a range from 0.1 to 0.7.

* * * * *